US010554098B2

(12) United States Patent
Von Schuttenbach et al.

(10) Patent No.: US 10,554,098 B2
(45) Date of Patent: Feb. 4, 2020

(54) RECIPROCATING PISTON ENGINE

(71) Applicant: HVD AG, Triesen (LI)

(72) Inventors: Andreas Von Schuttenbach, Ingolstadt (DE); Karl-Heinz Grabher, Vaduz (LI)

(73) Assignee: HVD AG, Triesen (LI)

( * ) Notice: Subject to any disclaimer, the term of this patent is extended or adjusted under 35 U.S.C. 154(b) by 0 days.

(21) Appl. No.: 16/216,596

(22) Filed: Dec. 11, 2018

(65) Prior Publication Data

US 2019/0199167 A1    Jun. 27, 2019

Related U.S. Application Data

(63) Continuation of application No. 15/106,210, filed as application No. PCT/EP2014/078924 on Dec. 19, 2014, now Pat. No. 10,181,769.

(30) Foreign Application Priority Data

Dec. 20, 2013    (EP) ..................................... 13199214
Jun. 27, 2014    (EP) ..................................... 14174734

(Continued)

(51) Int. Cl.
*H02K 7/00*      (2006.01)
*H02K 7/18*      (2006.01)
(Continued)

(52) U.S. Cl.
CPC ............ *H02K 7/1815* (2013.01); *B60K 6/24* (2013.01); *B60K 6/26* (2013.01); *B60K 6/485* (2013.01);
(Continued)

(58) Field of Classification Search
CPC .. B60K 6/26; B60Y 2400/60; B60Y 2200/92; H02K 7/1815
(Continued)

(56) References Cited

U.S. PATENT DOCUMENTS

| 4,757,686 A | 7/1988 | Kawamura et al. |
| 5,287,518 A | 2/1994 | Miller et al. |

(Continued)

FOREIGN PATENT DOCUMENTS

| CN | 103225539 A | 7/2013 |
| DE | 19729550 A1 | 1/1999 |

(Continued)

OTHER PUBLICATIONS

International Search Report and Written Opinion—PCT/EP2014/078924—ISA/EPO—dated Mar. 30, 2015.

(Continued)

*Primary Examiner* — Julio C. Gonzalez
(74) *Attorney, Agent, or Firm* — Muncy, Geissler, Olds, & Lowe, P.C.

(57) ABSTRACT

A reciprocating piston engine is disclosed having a first inner magnetic field unit, arranged on a first crank web of a crankshaft, and a stationary first outer magnetic field unit, wherein the first inner magnetic field unit and the first outer magnetic field unit together form a first electromagnetic converter, in particular an electric motor or an electric generator. The first crank web has a first compensating weight on a side that is opposite a first connecting rod bearing and that faces radially outwards in relation to a crankshaft axis, wherein the first compensating weight is made of a non-magnetizable material. The first inner magnetic field unit is arranged on a side of the first compensating weight that faces outwards in relation to the crankshaft axis. The invention also relates to a system comprising the reciprocating piston engine, an energy store, an electric control unit and a crankshaft sensor.

10 Claims, 19 Drawing Sheets

(30) Foreign Application Priority Data

Jun. 27, 2014 (EP) ..................................... 14174743
Jun. 27, 2014 (EP) ..................................... 14174744

(51) Int. Cl.

| | | |
|---|---|---|
| B60K 6/485 | (2007.10) | |
| F02D 13/02 | (2006.01) | |
| F02B 63/04 | (2006.01) | |
| B60K 6/24 | (2007.10) | |
| B60K 6/26 | (2007.10) | |
| F02N 11/04 | (2006.01) | |
| F02F 1/00 | (2006.01) | |
| F02F 7/00 | (2006.01) | |
| F16C 3/06 | (2006.01) | |

(52) U.S. Cl.
CPC ............ *F02B 63/04* (2013.01); *F02B 63/042* (2013.01); *F02D 13/0246* (2013.01); *F02F 1/00* (2013.01); *F02F 7/00* (2013.01); *F02N 11/04* (2013.01); *F16C 3/06* (2013.01); *H02K 7/1884* (2013.01); *B60Y 2200/92* (2013.01); *B60Y 2300/437* (2013.01); *B60Y 2400/43* (2013.01); *B60Y 2400/60* (2013.01); *Y02T 10/18* (2013.01); *Y02T 10/6226* (2013.01); *Y02T 10/6295* (2013.01); *Y10S 903/905* (2013.01); *Y10S 903/906* (2013.01)

(58) Field of Classification Search
USPC ................................ 290/46, 40 R, 40 A, 1 R
See application file for complete search history.

(56) References Cited

U.S. PATENT DOCUMENTS

| | | | |
|---|---|---|---|
| 6,137,199 A | 10/2000 | Lindsley | |
| 6,626,138 B2* | 9/2003 | Sayama | B60K 6/24 123/149 R |
| 7,245,050 B2* | 7/2007 | Iwata | B60K 6/24 310/52 |
| 7,629,713 B2 | 12/2009 | Beaulieu | |
| 2002/0088424 A1 | 7/2002 | Sayama et al. | |
| 2003/0051679 A1* | 3/2003 | Iwata | B60K 6/24 123/41.31 |
| 2003/0160455 A1 | 8/2003 | Hu et al. | |
| 2010/0004843 A1 | 1/2010 | Yu et al. | |
| 2012/0032441 A1 | 2/2012 | Engineer | |
| 2013/0231809 A1 | 9/2013 | Mamiya et al. | |
| 2016/0311303 A1 | 10/2016 | Schuttenbach Von et al. | |
| 2016/0315523 A1* | 10/2016 | Schuttenbach Von | F02B 63/04 |

FOREIGN PATENT DOCUMENTS

| | | |
|---|---|---|
| DE | 19814402 A1 | 10/1999 |
| DE | 10201601 C1 | 6/2003 |
| DE | 102005019019 A1 | 11/2006 |
| EP | 1223316 B1 | 7/2002 |
| EP | 1577522 A2 | 9/2005 |
| FR | 2877057 A1 | 4/2006 |

OTHER PUBLICATIONS

European Search Report—EP 14 17 4734—dated Jan. 28, 2015.
European Search Report—EP 14 17 4743—dated Oct. 13, 2014.
Partial European Search Report—EP 14 17 4734—dated Oct. 13, 2014.

* cited by examiner

RECIPROCATING PISTON ENGINE

CROSS REFERENCE TO RELATED APPLICATIONS

The present Application for patent is a continuation of U.S. application Ser. No. 15/106,210, entitled "RECIPROCATING PISTON ENGINE" filed Jun. 17, 2016, which claims the benefit of PCT Application No. PCT/EP2014/078924, filed on Dec. 19, 2014; and which claims priority of Application No. EP 13199214.1 filed in Europe on Dec. 20, 2013; and claims priority of Application No. EP 14174743.6 filed in Europe on Jun. 27, 2014; and claims priority of Application No. EP 14174734.5 filed in Europe on Jun. 27, 2014; and claims priority of Application No. EP 14174744.4 filed in Europe on Jun. 27, 2014, and each of which is herein incorporated by reference in its entirety.

BACKGROUND

The present invention relates to a reciprocating-piston engine having an electromechanical converter which can be operated as an electrical generator and/or as an electric motor, and to a system having a reciprocating-piston engine.

EP 1 223 316 B1 discloses a reciprocating-piston engine, in the crank chamber of which there is arranged an electromechanical converter which has the function of an electric motor and/or of an electrical generator. Magnetic-field-generating elements in the form of permanent magnets are arranged on a crankshaft, which is held rotatably in the crank chamber by way of a bearing cover attached to a cylinder block. The permanent magnets are inserted fixedly, by way of an interference fit, in recesses of the balancing weights of the crankshaft, and serve as additional balancing weights. Coils are held in static fashion in the crank chamber on the bearing cover. During rotation of the crankshaft, the permanent magnets rotate relative to the static coils, whereby a voltage is induced in the coils owing to the electromagnetic interaction between the permanent magnets and the coils, and the electromechanical converter acts as a generator. By feeding an alternating voltage to the coils, in particular from a battery, an electromagnetic force is exerted on the permanent magnets, and by way of the electromagnetic interaction, the electromechanical converter acts as an electric motor. Since the coils are held on the bearing cover, the coils can, together with the bearing cover, be attached to and removed from the cylinder block, which permits simple assembly and disassembly or exchange of the coils. It is also described that, for improved cooling, the coils are arranged in the region of the oil pan of the crank chamber and dip into the oil contained in the oil pan, whereby cooling of the coils by way of the oil is made possible.

In the case of the reciprocating-piston engine known from the prior art, the magnetic-field-generating elements in the form of permanent magnets are arranged in the balancing weights of the crankshaft by being fixed in recesses of the balancing weights by way of an interference fit. The arrangement of the permanent magnets in the provided recesses of the balancing weights has the advantage that the permanent magnets serve as additional balancing weights, and therefore an additional increase in weight of the crankshaft owing to the permanent magnets, in relation to a conventional crankshaft, can be avoided. Said arrangement however also has several disadvantages. Crankshafts are generally of unipartite form and are manufactured either in a casting process, in particular from spheroidal graphite iron, tempering steel or nitriding steel, or in a pressure forming process. The materials suitable for the production of highly loadable crankshafts, and used in mass production nowadays, are magnetizable. In other words, conventional crankshafts have ferromagnetic or ferrimagnetic characteristics. They are thus attracted by the magnetic pole of an external magnetic field without a high level of residual magnetization remaining; in other words, they are magnetically soft, or themselves give rise, after magnetization, to a static magnetic field because they are magnetically hard and exhibit high remanence. Conventional crankshafts exhibit only limited suitability for the arrangement of permanent magnets in recesses of balancing weights by way of an interference fit, because the permanent magnets give rise to magnetization of the crankshaft as a whole, and the generation of a directed magnetic field, which runs in a defined manner, for the efficient induction of a voltage in the coils surrounding the crankshaft is not possible. Furthermore, there is the risk of demagnetization of the permanent magnets. The arrangement described in EP 1 223 316 B1 systemically exhibits low electrical power owing to the arrangement of the permanent magnets. Since a crankshaft balancing weight, in order to perform its generic function, extends only in a range situated opposite the adjacent connecting-rod bearing, said range generally being considerably less than 120° and thus encompassing less than one third of the rotational circumference, the permanent magnets in the balancing weight can also only be arranged in said partial range, whereby the maximum electrical power of the electromechanical converter is severely limited. Furthermore, the arrangement of the permanent magnets by way of an interference fit in the crankshaft is cumbersome from a production aspect, and there is the risk of the permanent magnets becoming detached at high crankshaft rotational speeds.

SUMMARY

One problem on which the present invention is based consists in realizing a reciprocating-piston engine with integrated electromechanical converter, which reciprocating-piston engine is distinguished by increased electrical power, a simple construction and simplified serviceability, and which can be based on a conventional, non-electrified and only slightly modified reciprocating-piston engine.

A reciprocating-piston engine according to the invention, which can be used in particular as a motor vehicle engine, marine engine or static engine, comprises a cylinder block with a crank chamber which is formed at least partially in the cylinder block. The crank chamber is preferably closed off at the top by a corresponding structure of the cylinder block and at the bottom by an oil pan.

Within said crank chamber there is arranged a crankshaft. The crankshaft is rotatable, in multiple main bearings, about a crankshaft axis, that is to say is mounted so as to be rotatable about the crankshaft axis. In particular, the crankshaft is held in the crank chamber, so as to be rotatable about the crankshaft axis, by bearing covers which are fastened to the cylinder block preferably by way of screws. The crankshaft, which is preferably of unipartite form, but which may also be assembled from multiple parts, is composed of a magnetizable material. This is to be understood to mean that the crankshaft has ferromagnetic or ferrimagnetic characteristics at least in the region of its crank webs, and is magnetizable there. The crankshaft is thus attracted by the magnetic pole of an external magnetic field without a high level of residual magnetization remaining; in other words, said crankshaft is magnetically soft, or itself gives rise, after magnetization, to a static magnetic field because it is magnetically hard owing to a high remanence. In particular, the crankshaft is either manufactured in a casting process, for example from spheroidal graphite iron, tempering steel or nitriding steel, or is forged in a pressure forming process.

The crankshaft comprises, between two main bearings in which it is mounted so as to be rotatable about the crankshaft axis, at least one connecting-rod bearing which is offset with respect to the crankshaft axis. The offset is formed in each case by a crank web, which extends at least partially in a radial direction in relation to the crankshaft axis, between a main bearing and a connecting-rod bearing. In other words, the crank web extends with a geometrical direction component in a direction perpendicular to the crankshaft axis, that is to say in a radial direction. In relation to the crankshaft axis, the crank web is arranged axially adjacent to the first connecting-rod bearing. "Axially adjacent" is to be understood to mean that the crank web is situated directly or indirectly adjacent to the connecting-rod bearing in a direction running parallel to the crankshaft axis.

At least one first connecting rod, on which a linearly guided first piston is arranged, is mounted rotatably in a first connecting-rod bearing of the crankshaft. During rotation of the crankshaft, the connecting rod performs a connecting-rod movement in a geometric connecting-rod movement space. The connecting-rod movement is to be understood to mean the geometric movement space passed through by the connecting rod, which is made up of the lower connecting-rod eye mounted in the connecting-rod bearing, of the connecting-rod bearing cover, of the connecting-rod shank and of the connecting-rod head, during one full rotation of the crankshaft and one complete reciprocating movement of the piston. In other words, the connecting-rod movement space is that geometric free space within the crank chamber which is required for the unhindered movement of the connecting rod. It is possible for multiple connecting rods to be arranged adjacent to one another on the same connecting-rod bearing. In this case, the connecting-rod movement space is that free space within the crank chamber which is required for the free mobility of both connecting rods.

The first crank web, in particular all of the crank webs of the crankshaft, has/have a first fastening surface on a side which points radially outward with respect to the crankshaft axis and which is situated opposite the first connecting-rod bearing. In other words, the fastening surface points, at least with one direction component, in a direction which extends perpendicular to the crankshaft axis—that is to say radially—and which, in relation to the crankshaft axis, points toward the side situated opposite the side of which the connecting-rod bearing is located.

A fastening surface is to be understood generally to mean a mechanical interface which permits positively locking arrangement of a component, wherein the positive locking is realized in a radial direction, that is to say perpendicular to the crankshaft axis.

A first balancing weight is fixed in positively locking fashion in a radial direction, and in particular also in a circumferential direction, to the first fastening surface. Positive locking in a radial direction or circumferential direction is to be understood to mean a connection with an undercut such that positively locking fixing is realized at least in a radial direction or in a circumferential direction, respectively, with respect to the crankshaft axis. In other words, the first balancing weight is fixed in positively locking fashion to the fastening surface such that the balancing weight remains fixed on the crankshaft during rotation of said crankshaft. In particular, the positive locking is realized by way of a screw connection.

In particular, the first fastening surface and/or the first balancing weight have/has at least one threaded bore, wherein the positively locking connection is produced by way of at least one screw guided through a passage bore which is formed in the first balancing weight and in the first fastening surface. Alternatively or in addition, the positively locking connection may be realized by way of an undercut which extends in particular parallel to the crankshaft axis and which is formed for example by a linear guide, which runs axially or extends parallel to the crankshaft, between the first fastening surface and the first balancing weight, in particular a dovetail-like guide, wherein the first balancing weight is held in a direction parallel to the crankshaft axis, that is to say axially, for example in non-positively locking, frictionally engaging or positively locking fashion, in particular by way of a screw connection.

The first balancing weight is composed of a non-magnetizable material. In particular, the first balancing weight is composed of cast iron, high-grade steel, carbon fiber, a ceramic material, aluminum and/or at least one other non-magnetizable material. Cast-iron is formed in particular by austenitic cast-iron, in particular gray cast iron. Carbon fiber is in particular sintered. Alternatively, it is however also possible for the first balancing weight to be made up of a combination of at least two of said materials, or of one of said materials with a further non-magnetizable material. In particular, the balancing weight may also be composed of an encapsulated non-magnetizable material. Said material preferably has a high specific weight. The weight and the arrangement of the balancing weight, together with the weight of the first inner magnetic field unit described further below and arranged on the balancing weight, should be such that the rotating inertia force resulting from the eccentricity of the first connecting-rod bearing, of the at least one first connecting rod and in particular of the first piston is substantially, preferably entirely, compensated. The respective proportion of balancing weight and inner magnetic field unit may vary as desired, as long as the mass balancing is substantially or fully possible.

The first inner magnetic field unit is arranged on a side, which points radially outward in relation to the crankshaft axis, of the first balancing weight. In other words, the first inner magnetic field unit and the first balancing weight are connected to one another, wherein the first inner magnetic field unit extends in a direction radially outward in relation to the crankshaft axis. In particular, the first inner magnetic field unit is pushed into a first linear guide, which extends in an axial direction—that is to say substantially parallel to the crankshaft axis—on the first balancing weight and is fixed axially there, such that said first inner magnetic field unit is also fixedly held, for example with non-positively locking, frictionally engaging or positively locking action, in a direction parallel to the crankshaft axis during normal operation of the crankshaft. Said first linear guide fixes the first inner magnetic field unit in positively locking fashion in a radial direction and circumferential direction in relation to the crankshaft axis. Positive locking in a radial direction and circumferential direction is generally to be understood to mean a connection with an undercut such that positively locking fixing is realized at least in a radial direction or in a circumferential direction, respectively, with respect to the crankshaft axis. In other words, the first inner magnetic field unit is fixed in positively locking fashion to the first balancing weight of the fastening surface such that the first inner magnetic field unit remains fixed on the crankshaft during rotation of said crankshaft.

Thus, the first inner magnetic field unit is, by way of the first balancing weight fixed to the first fastening surface, arranged on the first crank web of the crankshaft such that the first inner magnetic field unit points radially outward in relation to the crankshaft axis. Here, during rotation of the crankshaft, the first inner magnetic field unit circulates around the crankshaft axis on a geometric first circular path which is axially adjacent to the connecting-rod movement space. In other words, both the first inner magnetic field unit and the first balancing weight are shaped and arranged such that the connecting rod, on the one hand, and the first inner magnetic field unit and the first balancing weight, on the other hand, move without colliding during rotation of the crankshaft, wherein the movement spaces of the connecting rod, on the one hand, and of the first inner magnetic field unit and of the first balancing weight, on the other hand, are situated in axially spaced-apart but axially mutually adjacent opposed positions.

In the case of a conventional, non-electrified reciprocating-piston engine with a conventional crankshaft with integrally formed balancing weights, said collision-free mobility within the crank chamber is already realized. Thus, it is possible for the balancing weights of a conventional crankshaft of said type to be removed in particular by way of a cutting machining process, and for a fastening surface for the non-magnetizable balancing weight to be provided, wherein the non-magnetizable balancing weight and the inner magnetic field unit either have substantially the same cross section in the radial and axial directions—that is to say the same rotational cross section—as the removed balancing weight, or have an enlarged rotational cross section in order to utilize the available space in the crank chamber to best possible effect. The extent in a circumferential direction, that is to say along the circular movement path of the non-magnetizable balancing weight and of the inner magnetic field unit, may be varied as desired in geometric terms, because said space within the crank chamber remains free in order to permit the free rotatability. To permit compensation of the rotating inertia force, it is however advantageous for the extent of the non-magnetizable balancing weight in the circumferential direction to be limited substantially to the range situated opposite the connecting-rod bearing.

In one variant of the invention, the non-magnetizable balancing weight and the inner magnetic field unit are of unipartite form and are in particular accommodated in the same housing, wherein the unipartite unit can be divided functionally into a balancing weight section and a section of the inner magnetic field unit.

The first fastening surface and further sections of the crankshaft may serve, in addition to the at least one non-magnetizable balancing weight, as balancing weights for the mass balancing. It is likewise possible for the reciprocating-piston engine to additionally have a balancing shaft for the compensation of inertia forces and/or inertia torques.

A first outer magnetic field unit is arranged in static fashion in the crank chamber so as to be radially spaced apart from the first circular path of the first inner magnetic field unit. In other words, said first outer magnetic field unit surrounds, engages around or encloses the first circular path of the first inner magnetic field unit. In other words again, said first outer magnetic field unit is arranged radially outside the rotational movement space of the first inner magnetic field unit, and engages either partially or fully around said movement space, in particular with an engaging-around angle of between 120° and 360°.

The first inner magnetic field unit and the first outer magnetic field unit are arranged and designed such that, together, they form a first electromechanical converter, in particular an electric motor or an electrical generator. For this purpose, one of the two magnetic field units forms a magnetic-field-generating unit, and the other forms a coil unit which, at least in a subsection of a full rotation of the crankshaft, is acted on by the magnetic field of the magnetic-field-generating unit, wherein a voltage is induced in the coil unit by a magnetic field which changes owing to rotation of the crankshaft, such that the electromechanical converter acts as a generator, or wherein, by application of an electrical voltage to the coil unit, a magnetic field can be generated, by way of which a force can be exerted on the magnetic-field-generating unit and thus on the crankshaft, and the crankshaft can thus be set in rotation, such that the electromechanical converter acts as an electric motor.

In other words, during rotation of the crankshaft, the magnetic-field-generating unit and the coil unit rotate relative to one another, whereby, owing to the electromagnetic interaction between the magnetic-field-generating unit and the coil unit, a voltage is induced in the coil unit, and the electromechanical converter acts as a generator. By feeding an alternating voltage to the coil unit, in particular from a battery, an electromagnetic force is exerted on the magnetic-field-generating unit, and by way of the electromagnetic interaction, the electromechanical converter acts as an electric motor.

The first inner magnetic field unit arranged on the crankshaft may be formed by a first inner permanent magnet unit, which generates a permanent magnetic field by way of at least one permanent magnet, or by a first inner coil unit, by means of which an electromagnetic field can be generated, or in which a voltage can be induced by way of a magnetic alternating field.

The first outer magnetic field unit arranged in static fashion in the crank chamber may also be formed by a first outer coil unit, by way of which an electromagnetic field can be generated or in which a voltage can be induced by way of a magnetic alternating field, or by a first outer permanent magnet unit, which generates a permanent magnetic field by way of at least one permanent magnet. In order that the two magnetic field units can form an electromechanical converter, at least one of the two magnetic field units must be in the form of a coil unit.

An advantage of the reciprocating-piston engine according to the invention consists in that, owing to the arrangement of a non-magnetizable balancing weight on the magnetizable crankshaft and the arrangement of the first inner magnetic field unit on said non-magnetizable balancing weight, magnetization of the crankshaft, and thus adverse influencing of the magnetic field by the crankshaft, can be substantially prevented, because the non-magnetizable balancing weight acts as a magnetic insulator between the crankshaft and the inner magnetic field unit. Thus, long-term demagnetization of the permanent magnets is also reduced, if the first inner magnetic field unit is in the form of a permanent magnet unit.

A further advantage consists in that the extent of the first inner magnetic field unit in a circumferential direction, that is to say along the circular movement path of the inner magnetic field unit, can be substantially independent of the extent of the first balancing weight, because the latter, owing to the generic function of a balancing weight, is restricted to the range situated opposite the connecting-rod bearing. For example, it is possible for the extent of the balancing weight in a circumferential direction to amount to less than 135°, in particular less than 120°, especially less than 90°, whereas the extent of the inner magnetic field unit in the circumferential direction amounts to greater than 135°, in particular greater than 180°, in particular greater than 210°, especially greater than 360°, wherein, in the case of an extent of 360°, the inner magnetic field unit has the geometric outline of a closed ring. This has the effect that the entire circumference of the first geometric circular path is utilized for the arrangement of the inner magnetic field unit, and thus the achievable electrical power of the first electromechanical converter can be considerably increased.

In a refinement of the invention, the first inner magnetic field unit has the shape of a circular-arc-shaped inner ring section which surrounds the first crank web and which has a geometric first axis which lies on the crankshaft axis. In other words, the first inner magnetic field unit has the shape of a ring section, that is to say of a ring segment, which has a circular arc shape, wherein the axis about which the circular arc or the ring segment extends and on which the central point of the circular arc lies is formed by a geometric first axis. In the assembled state of the crankshaft and first inner magnetic field unit, the first axis and the crankshaft axis coincide and form a common axis. In other words again, the circular-arc-shaped first inner magnetic field unit extends in a circumferential direction in relation to the crankshaft axis, that is to say along the circular movement path of the inner magnetic field unit, with the first axis as geometric central axis. In particular, the circular-arc-shaped inner ring section extends with a first center angle of greater than 135°, in particular greater than 180°, in particular greater than 210°. The center angle is to be understood to mean the angle, also referred to as central angle, enclosed, at the central point of the geometric circular arc, by the two circle radii which delimit the geometric circular arc.

In a particular refinement, the circular-arc-shaped inner ring section extends with a first center angle of 360°, wherein the first inner magnetic field unit has the shape of a closed circular inner ring surrounding the first crank web. In other words, the first inner magnetic field unit has the shape of a closed ring, in other words of a geometric circle, wherein said inner ring at least partially or fully surrounds the first crank web of the crankshaft. The geometric central point of said ring lies on the first axis or on the crankshaft axis.

In a refinement of the invention, the first outer magnetic field unit may also have the shape of a circular-arc-shaped outer ring section with a geometric second axis which lies on the crankshaft axis. Said circular-arc-shaped outer ring section surrounds the first circular path of the first inner magnetic field unit with a radial spacing. In particular, the inner and outer ring sections run concentrically. If the first inner magnetic field unit has the shape of a circular-arc-shaped inner ring section or of a ring, the outer diameter of said inner ring section or ring is in particular smaller than the inner diameter of the outer ring section or ring. In particular, the circular-arc-shaped outer ring section extends with a second center angle of greater than 135°, in particular greater than 180°, in particular greater than 210°. In a particular embodiment of the invention, the circular-arc-shaped outer ring section extends with a second center angle of 360°, wherein the first outer magnetic field unit has the shape of a closed circular outer ring which surrounds the first circular path of the first inner magnetic field unit with a radial spacing.

The described ring sections or rings may have any desired cross section, in particular a rectangular, square, polygonal, circular, oval or other cross section.

The outer magnetic field unit is in particular arranged on a bearing cover of a main bearing, which is adjacent to the first crank web, of the crankshaft. For this purpose, the outer magnetic field unit may have a bracket which are fixed to the bearing cover by way of bearing cover screws which also connect the bearing cover to the cylinder block. Thus, the outer magnetic field unit can be arranged in a conventional reciprocating-piston engine without the provision of further fastening elements.

In a preferred embodiment, the first inner magnetic field unit is permanently magnetic and is in the form of a first inner permanent magnet unit. This has the advantage that no electrical connection or means for voltage transmission to the rotatable crankshaft has to be produced.

The first inner permanent magnet unit has at least one permanent magnet which is designed and arranged such that, during rotation of the crankshaft, a magnetic alternating field, that is to say a changing magnetic field, exists in a region situated radially outside the first inner permanent magnet unit, which region does not co-rotate. In other words, the first inner permanent magnet unit is designed such that, during rotation thereof, a magnetic alternating field prevails in the first outer magnetic field unit, and a voltage can be induced there.

In a refinement of the invention, the first inner permanent magnet unit has first permanent magnets arranged in a line with one another in a circle-circumferential direction in relation to the crankshaft axis, in such a way that the magnetic polarity of the first permanent magnets alternates in the circle-circumferential direction such that a magnetic alternating field is generated during rotation of the crankshaft. In other words, north and south poles of multiple permanent magnets of the permanent magnet unit alternate such that a changing magnetic field is generated during rotation of the crankshaft. In particular, the first permanent magnets are arranged adjacent to one another, in particular along the circular-arc-shaped inner ring section, and have north poles pointing in a common circumferential direction. The magnetic axis running between the north and south pole of each permanent magnet thus runs in the circle-circumferential direction with respect to the rotary path. Said magnetic axis thus forms in particular a tangent to the circular path of the first inner permanent magnet unit, or runs parallel to a tangent of said type, or runs as a circular arc parallel to said circular path. Alternatively, the first permanent magnets may have, adjacent to one another in particular along the circular-arc-shaped inner ring section, north and south poles of alternating polarity orientation pointing in a radial direction. In other words, the magnet axes running between the north and south poles of each permanent magnet thus run in each case radially with respect to the first axis or with respect to the crankshaft axis; in particular, said magnet axes intersect substantially at a point lying on the first axis or on the crankshaft axis, wherein the polarity orientation of adjacent permanent magnets alternates in each case.

Any other permanent magnet orientations which give rise to the described magnetic alternating field during rotation of the crankshaft are possible according to the invention.

The first inner magnetic field unit may however alternatively be electromagnetic, in the form of a first inner coil unit. In particular, the permanent magnets are replaced by coils. In this case, the magnetic field is generated by the first inner magnetic field unit not by permanent magnets but rather electromagnetically, or a magnetic field generated by the first outer magnetic field unit electromagnetically interacts with the first inner coil unit, and induces a voltage there.

Possible refinements of the invention provide different coil arrangements of the first inner coil unit. The coil arrangements correspond, in part, to the arrangements of the permanent magnets already described above, wherein the above statements relating to the permanent magnets also apply to the coils.

In a first variant, the first inner coil unit has first coils which are arranged in a line with one another in a circle-circumferential direction in relation to the crankshaft axis, the first coil axes of which first coils run radially in relation to the crankshaft axis. In particular, said coil axes intersect substantially at a point close to or on the first axis or the crankshaft axis. In particular, the first coils are arranged and/or interconnected such that the magnetic polarity of the first coils alternates in the circle-circumferential direction, such that a magnetic alternating field is generated during rotation of the crankshaft. This may be realized for example in that the first coils, arranged in a line with one another, are supplied with voltage of alternating electrical polarity, or in that the coil windings are alternately inverse, such that the magnetic polarity of the first coils alternates in the circle-circumferential direction, such that a magnetic alternating field is generated during rotation of the crankshaft. In other words, north and south poles of multiple first coils of the first coil unit alternate such that a changing magnetic field is generated during rotation of the crankshaft. It is firstly possible for the magnetic field generated by way of the first coil unit to be constant relative to the first coil unit by virtue of a constant voltage supply being provided to the first coils, or for the magnetic field generated by way of the first coil unit to also alternate relative to the first coil unit by virtue of the voltage supply of the first coils alternating. Said alternation may be realized in particular by way of a commutator.

In a second variant, the first inner coil unit comprises at least one first coil which extends in the circle-circumferential direction and the first coil axis of which runs in the circle-circumferential direction. In the third variant, the first inner coil unit has at least one first coil, the first coil axis of which runs parallel to the crankshaft axis.

To generate a magnetic field by way of the at least one first coil, in particular the first coils, said first coil or coils may either be supplied with a voltage, or the first coils are interconnected with one another, and arranged, such that, during rotation of the crankshaft and under the action of an external magnetic field, which is effected in particular by the first outer magnetic field unit and which in particular alternates owing to the rotation, on the first coils, said first coils supply voltage to one another, in particular by being designed as a short-circuit rotor, for example of an asynchronous machine.

To supply voltage to the first inner coil unit, the crankshaft may for example have sliding contacts in the crank chamber between the cylinder block and the crankshaft, by way of which sliding contacts a multipolar electrical connection to the coil unit can be produced. In particular, said connection is a two-pole, three-pole or multipolar connection in order to supply several of the first coils with different voltages in alternating fashion. This alternating voltage supply may be realized in a manner dependent on the position of the crankshaft. For this purpose, the sliding contacts may also be in the form of a commutator. A sliding-contact connection of said type is substantially non-critical in the case of an engine whose crank chamber contains engine oil, but is associated with risks especially in the case of an internal combustion engine operated with a fuel-oil mixture, in particular a two-stroke engine, owing to possible spark generation. Furthermore, sliding contacts are subject to increased wear.

Therefore, in one refinement, the invention also comprises a contactless voltage supply to the at least one first coils of the first inner coil unit on the crankshaft. For this purpose, the first inner coil unit has at least one additional coil which is electrically connected to the at least one first coil. A permanently magnetic or electromagnetic lateral magnetic field unit is arranged in static fashion in the crank chamber axially adjacent to the first circular path of the first inner coil unit. The at least one additional coil and the lateral magnetic field unit are arranged relative to one another, in particular are in axially opposed positions with respect to one another in relation to the crankshaft axis, and designed, such that, during rotation of the crankshaft about the crankshaft axis, said at least one additional coil and lateral magnetic field unit together form an electrical generator for the supply of electrical voltage to the at least one first coil. The at least one additional coil has, in particular, an additional-coil axis running parallel to the crankshaft axis. In particular, the at least one additional coil is formed by multiple additional coils arranged in a line with one another in a circle-circumferential direction. Said additional coils arranged in a line with one another have additional-coil axes running preferably parallel to the crankshaft axis. In particular, each first coil is assigned a first additional coil, wherein the first coil and the first additional coil are electrically connected. The first additional coils are preferably integrated in the first coil unit. The lateral magnetic field unit is in particular electromagnetic, and is formed by multiple lateral coils arranged in a line with one another in a circle-circumferential direction, in particular with lateral-coil axes running parallel to the crankshaft axis. By application of an electric alternating voltage to the lateral coils, and/or during rotation of the crankshaft, magnetic induction in the additional coils occurs owing to the magnetic interaction between the lateral coils and the additional coils. With the voltage thereby generated, the first coils of the first inner coil unit are supplied with voltage, such that said first coils in turn generate an electromagnetic field, by way of which, during rotation of the crankshaft, a voltage can be induced in the outer magnetic field unit.

An advantage of said arrangement consists in that the use of permanent magnets can be either entirely or partially dispensed with, and the reciprocating-piston engine, during combustion engine operation, can, with the first inner coil unit in a voltage-free state, be operated without magnetic resistance, whereby the efficiency of the combustion engine is increased.

In one variant of the invention, the first outer magnetic field unit is electromagnetic and is in the form of a first outer coil unit, wherein the first inner magnetic field unit is either permanently magnetic or electromagnetic. The first outer coil unit may have second coils arranged in a line with one another in a circle-circumferential direction, the second coil axes of which second coils run radially in relation to the crankshaft axis. In particular, the second coil axes of the preferably uniformly distributed second coils intersect substantially at a point which lies close to or on the second axis or the crankshaft axis. In other words, the second coils are arranged—preferably uniformly—in stellate fashion on the first outer magnetic field unit.

Alternatively, the first outer coil unit comprises at least one second coil which extends in a circle-circumferential direction and the second coil axis of which runs in the circle-circumferential direction. The second coil axis may for example run either in circular-arc-shaped fashion or in straight fashion, wherein, in the former case, the circular arc preferably runs concentrically with respect to the circular-arc-shaped outer ring section or the circular path of the first inner magnetic field unit, with a geometric axis lying on the second axis. In the latter case, that is to say a straight second coil axis, said second coil axis preferably runs parallel to a tangent to the circular-arc-shaped outer ring section.

In a further variant, the first outer coil unit comprises at least one second coil, the second coil axis of which runs parallel to the crankshaft axis. On the one hand, said at least one second coil may fully surround the crankshaft, wherein the first outer coil unit has the shape of a closed circular outer ring which surrounds the first circular path of the first inner magnetic field unit with a radial spacing. In this case, the second coil axis, which runs parallel to the crankshaft axis, lies preferably on said crankshaft axis. Alternatively, the at least one second coil is arranged adjacent to the first inner magnetic field unit and has, in particular, a circular arc shape or banana shape.

If the first inner magnetic field unit is electromagnetic, the first outer magnetic field unit may, instead of an electromagnetic design, be permanently magnetic, wherein the first outer magnetic field unit is formed by a first outer permanent magnet unit. In this case, the first outer permanent magnet unit has second permanent magnets arranged in a line with one another in relation to the crankshaft axis in the circle-circumferential direction, in particular in such a way that the magnetic polarity of the second permanent magnets alternates in the circle-circumferential direction, such that a magnetic alternating field is generated during rotation of the crankshaft. The second permanent magnets are arranged adjacent to one another along the circular-arc-shaped inner ring section, and have north poles pointing in a common circumferential direction. Alternatively, the second permanent magnets are arranged adjacent to one another along the circular-arc-shaped inner ring section, and have poles of alternating polarity orientation pointing in a radial direction. Any other type of arrangement or orientation of the second permanent magnets in the first outer permanent magnet unit is possible as long as, during rotation of the first inner coil unit, said coil unit is acted on by a relative alternating field of said type such that the two units together form an electromechanical converter.

Up to this point, the invention has been described on the basis of a crankshaft having a single first connecting-rod bearing, a single first connecting rod which is mounted rotatably in the first connecting-rod bearing of the crankshaft, and a single first crank web, which is axially adjacent to the first connecting-rod bearing in relation to the crankshaft axis, wherein the first inner magnetic field unit arranged according to the invention on the first crank web, and the first outer magnetic field unit, together form a first electromechanical converter.

The reciprocating-piston engine however preferably additionally has a second electromechanical converter arranged on the second crank web, which is situated axially opposite the first crank web, of the first connecting-rod bearing, wherein said second electromechanical converter has in particular the same features as the first electromechanical converter or has corresponding variations according to the invention of said first electromechanical converter. The second crank web may also have a second fastening surface corresponding to the first crank web, on which second fastening surface there is arranged a second balancing weight which corresponds to the first balancing weight.

In particular, the reciprocating-piston engine comprises a second inner magnetic field unit, said second inner magnetic field unit being arranged on a second crank web, which is axially adjacent to the first connecting-rod bearing and which is situated axially opposite the first crank web, of the crankshaft in such a way that the second inner magnetic field unit points radially outward in relation to the crankshaft axis and, during rotation of the crankshaft, circulates around the crankshaft axis on a geometric second circular path which is axially adjacent to the connecting-rod movement space. A second outer magnetic field unit is arranged in static fashion in the crank chamber so as to be radially spaced apart from the second circular path, in such a way that the second outer magnetic field unit and the second inner magnetic field unit together form a second electromechanical converter. The connecting-rod movement space of the at least one first connecting rod extends in an axial intermediate space between the first circular path and the second circular path. The second crank web has a second fastening surface on a side which points radially outward in relation to the crankshaft axis and which is situated opposite the first connecting-rod bearing. A second balancing weight is fixed in positively locking fashion in a radial direction to the second fastening surface. The second balancing weight is composed of a non-magnetizable material. The second inner magnetic field unit is arranged on a radially outwardly pointing side of the second balancing weight. In particular, the second inner magnetic field unit corresponds to the first inner magnetic field unit. In particular, the second outer magnetic field unit corresponds to the first outer magnetic field unit. In particular, the second balancing weight corresponds to the first balancing weight.

It is also possible for two first connecting rods to be arranged on the first connecting-rod bearing, which first connecting rods are mounted, adjacent to one another, rotatably in the first connecting-rod bearing of the crankshaft, and which first connecting rods, during rotation of the crankshaft, jointly perform a connecting-rod movement in two different connecting-rod movement spaces which form the common geometrical connecting-rod movement space, as is the case in particular in V-configuration engines.

The described arrangement having one or two electromechanical converters per connecting-rod bearing, and one or two connecting rods per connecting-rod bearing, may be used, according to the invention, in any multi-cylinder engine of in-line configuration, V-configuration, VR-configuration, W-configuration or other type of construction, wherein the one or more electromechanical converters are arranged, according to the invention, either only on some of the connecting-rod bearings or on all connecting-rod bearings. In particular, said multiplicity of electromechanical converters is individually switchable in a manner dependent on the power demand.

A particular advantage of the invention consists in that the described electrified reciprocating-piston engine can be based on a conventional, non-electrified reciprocating-piston combustion engine, that is to say one which is not equipped with an integrated electric motor or generator, in particular an Otto-cycle or diesel combustion engine. It is thus possible for a purely combustion-engine-driven vehicle to be driven electrically, and/or equipped with an additional generator, using the same base combustion engine with relatively minor adaptations of the reciprocating-piston engine. For the integration of the electromechanical converter, only relatively minor adaptations to the reciprocating-piston engine are required, primarily to the crankshaft thereof. The crankshaft according to the invention may be based on a conventional crankshaft, and may in particular be produced by way of a cutting machining process.

A further advantage of the invention consists in that the electromechanical converter can be integrated entirely in the crankcase of the reciprocating-piston engine, such that additional electric motors for driving the vehicle, in particular the hybrid vehicle, or generators for electricity generation can be omitted. Furthermore, an external alternator can be dispensed with.

The reciprocating-piston engine may comprise an oil pan which closes off the crank chamber, and the coil units may dip into the oil situated in the oil pan, whereby cooling of the coil units by way of the oil contained in the oil pan, and consequently cooling of the electromechanical converter, is realized.

A further aspect of the invention provides that the crankshaft is composed of a magnetizable or non-magnetizable material, the first crank web, on a side which points radially outward in relation to the crankshaft axis and which is situated opposite the first connecting-rod bearing, does not have a first fastening surface but rather is formed integrally with the first balancing weight, the first balancing weight is accordingly, like the crankshaft, composed of a magnetizable or non-magnetizable material or, alternatively, the first crank web has the described first fastening surface but the balancing weight is composed of a magnetizable material, and wherein the first inner magnetic field unit is arranged on a side, which points radially outward in relation to the crankshaft axis, of the first balancing weight, wherein the first inner magnetic field unit has the shape of a circular-arc-shaped inner ring section which surrounds the first crank web and which has a geometric first axis which lies substantially on the crankshaft axis, and the circular-arc-shaped inner ring section extends with a first center angle of greater than 135°, in particular greater than 180°, in particular greater than 210°, wherein in particular, the first center angle is greater, by at least 60°, in particular by at least 90°, in particular by at least 120°, than the center angle of the circumferential extent of the balancing weight, wherein in particular, the circular-arc-shaped inner ring section projects beyond the first balancing weight to one side or to both sides in a circumferential direction by at least 30°, in particular by at least 60°, in particular by at least 90°. In particular, the circular-arc-shaped inner ring section extends with a first center angle of 360°, and the first inner magnetic field unit has the shape of a closed circular inner ring which surrounds the first crank web. The other features of the reciprocating-piston engine may be as described in the introduction.

In particular, the first inner magnetic field unit has a ring-shaped carrier composed of a magnetizable or non-magnetizable material, the specific weight of which is lower, in particular significantly lower, than the specific weight of the first balancing weight.

In particular, the specific weight of the ring-shaped carrier amounts to at most 80%, 60%, 40% or 20% of the specific weight of the balancing weight. Either the at least one permanent magnet, in particular the first permanent magnets, or the at least one first coil is/are arranged on the ring-shaped carrier. For example, the ring-shaped carrier is composed of at least one of the following materials: plastic, carbon fiber, aluminum, magnesium, metal alloy and/or ceramic. The ring-shaped carrier is designed so as to hold the ring-shaped structure, which projects in particular beyond the circumferential extent of the balancing weight in a circumferential direction, static during rotation of the crankshaft within the operating rotational speed range of the reciprocating-piston engine, such that an elastic or plastic deformation of the first inner magnetic field unit, arising in particular owing to centrifugal force, is prevented to the extent required to prevent a collision of the first inner magnetic field unit with the first outer magnetic field unit during the operation of the reciprocating-piston engine.

The invention also comprises a system composed of the described reciprocating-piston engine according to the invention, of a chargeable and dischargeable electrical energy store, of an electrical control unit, and of a crankshaft sensor for detecting a position of the crankshaft. The energy store may for example be a chargeable and dischargeable battery or a capacitor. The electrical control unit may be formed in particular by an electronic controller, in particular an engine control unit. The crankshaft sensor is for example an electronic angle sensor, by way of which the angular position—in particular discrete angle position ranges—of the crankshaft relative to the cylinder block can be detected and supplied, in particular by way of an electrical signal, to the control unit.

The control unit of the system is electrically interconnected with the electrical energy store, with the first electromechanical converter and, if provided, with the second or each further electromechanical converter, and designed, in particular programmed, such that the reciprocating-piston engine can be switched between an electric-motor operating mode and a generator operating mode.

In the electric-motor operating mode, the crankshaft can be driven with electric motor action, by virtue of the electrical energy store being discharged, by application of a voltage to the at least one electromechanical converter, more specifically to the at least one coil unit thereof, such that the converter acts as an electric motor. In the generator operating mode, the electrical energy store can be charged by virtue of the crankshaft being mechanically driven, in particular by virtue of the crankshaft being driven with combustion engine action by way of the reciprocating-piston engine or by virtue of the crankshaft being driven by external action, for example by way of the vehicle wheels during the deceleration of the vehicle. The switching may be performed automatically in a manner dependent on the operating mode of the reciprocating-piston engine, on the combustion engine power thereof, on the state of charge of the electrical energy store and/or on an external user preset. Such automatic switching systems are known in particular from the field of hybrid vehicle technology.

The reciprocating-piston engine has an electrically actuable variable outlet valve drive for at least one first outlet valve which is assigned to a first combustion chamber of a first piston which is coupled to the at least one first connecting rod, said electrically actuable variable outlet valve drive being designed such that the at least one first outlet valve can be opened regardless of the position of the crankshaft. Such variable and freely actuable valve drives, in particular electromechanical, electromagnetic or pneumatic valve drives, for the opening and closing of the inlet and/or outlet valves of a reciprocating-piston engine are known in a variety of embodiments from the prior art.

According to the invention, the control unit is interconnected with the crankshaft sensor and with the variable outlet valve drive, and designed, in particular programmed, such that, in the second operating mode, in particular in the electric-motor operating mode, the at least one first outlet valve is opened in a position range of the crankshaft in which the first piston is situated in a compression stroke. In particular, the first outlet valve is open during the entire compression stroke and exhaust stroke of the piston, alternatively during a major part of the respective stroke, in particular at least 35%, 50%, 75% or 90% of the stroke as measured in relation to the reciprocating movement of the piston, such that the reciprocating-piston engine can be driven with electric motor action with reduced resistance. In particular, the control unit is programmed such that the outlet valve is open or opened in an angle position range of the crankshaft which corresponds to the compression stroke and exhaust stroke. This aspect of the invention can, according to the invention, be implemented not only with the reciprocating-piston engine described according to the invention, but generally in combination with a reciprocating-piston engine which has any crankshaft which is mechanically coupled to any electromechanical converter, in particular an electric motor or an electrical generator, wherein the crankshaft can be driven by the electromechanical converter in an electric-motor operating mode.

A compression stroke is to be understood generally to mean a stroke in which the volume in the combustion chamber is reduced, whereas expansion stroke generally means a stroke in which the volume in the combustion chamber is increased. In general, during a compression stroke, the piston moves toward the inlet and the outlet valve and away from the crankshaft, whereas, during an expansion stroke, the piston moves away from the valves and toward the crankshaft. Thus, the four strokes of a 4-stroke engine comprise two compression strokes and two expansion strokes, whereas the two strokes of the 2-stroke engine comprise one compression stroke and one expansion stroke. The reciprocating-piston engine according to the invention is preferably a 4-stroke engine.

A refinement of the invention provides that the reciprocating-piston engine has an electrically actuable variable inlet valve drive for at least one first inlet valve which is assigned to a first combustion chamber of a first piston that is coupled to the at least one first connecting rod, said electrically actuable variable inlet valve drive being designed such that the at least one first inlet valve can be opened regardless of the position of the crankshaft. The control unit is interconnected with the crankshaft sensor and with a variable inlet valve drive, and designed, in particular programmed, in such a way that, in the electric-motor operating mode, the at least one first inlet valve is open in a position range of the crankshaft in which the first piston is situated in an expansion stroke. The inlet valve control may correspond to the outlet valve control described above.

The described outlet valve control and the described inlet valve control are preferably combined with one another. This means that, in the second operating mode, in particular the electric-motor operating mode, the reciprocating-piston engine draws air in via the open inlet valve during every expansion stroke, and said air is discharged via the outlet valve during every compression stroke. Thus, in the second operating mode, in particular the electric-motor operating mode, the valve control of the reciprocating-piston engine, which is in particular in the form of a 4-stroke engine, corresponds to a 2-stroke engine. In other words, the control unit is interconnected with the crankshaft sensor, with the variable inlet valve drive and with the variable outlet valve drive, and designed, in particular programmed, in such a way that, in the second operating mode, in particular the electric-motor operating mode, the at least one first inlet valve is open in a position range of the crankshaft in which the first piston is situated in an expansion stroke, and, in the second operating mode, in particular the electric-motor operating mode, the at least one first outlet valve is open in a position range of the crankshaft in which the first piston is situated in a compression stroke, or in other words, the inlet valve drive and the outlet valve drive run in 2-stroke operation.

In a refinement of said system, the control unit is designed such that regular switching between the second operating mode, in particular the electric-motor operating mode, and the first operating mode, in partuicular the generator operating mode is performed. Said switching is performed in a manner dependent on an electronic accelerator pedal signal and/or in a manner dependent on a crankshaft rotational speed signal or on a time-dependent basis or after a certain number of rotations of the crankshaft.

Furthermore, the invention comprises a further system which may be based on, and have the features of, the system described in the introduction but which does not necessarily have to be based thereon, and which may also be used as an independent system. Said further system comprises a reciprocating-piston engine, which is in particular designed as one of the described reciprocating-piston engines according to the invention, a chargeable and dischargeable electrical energy store, and a crankshaft sensor for detecting a position of the crankshaft, as already described in conjunction with the above system. Additionally, the system comprises an electric power control element. The latter is formed for example by an electrical control unit, in particular the electrical control unit mentioned in the introduction, or by an electronic controller, in particular an engine control unit.

The reciprocating-piston engine has a first piston to which the first electromechanical converter, which is arranged on one side of the first connecting-rod bearing, and in particular the second electromechanical converter, which is arranged on the other side of the first connecting-rod bearing, are assigned. The first piston is coupled to the at least one first connecting rod, which is mounted rotatably in the first connecting-rod bearing of the crankshaft. Furthermore, the reciprocating-piston engine has a second piston to which a third electromechanical converter, which is arranged on one side of a second connecting-rod bearing, and in particular a fourth electromechanical converter, which is arranged on the other side of the second connecting-rod bearing, are assigned. The second piston is coupled to at least one second connecting rod, which is mounted rotatably in the second connecting-rod bearing of the crankshaft. In particular, the third electromechanical converter corresponds to the first electromechanical converter, and the fourth electromechanical converter corresponds to the second electromechanical converter.

The power control element is electrically interconnected with the electrical energy store, with the first electromechanical converter and with the third electromechanical converter, in particular also with the second electromechanical converter and/or with the fourth electromechanical converter, in particular by way of an electronic signal connection, and designed, in particular programmed, in such a way that the reciprocating-piston engine can be operated in an electric-motor operating mode. Alternatively, the power control element is designed and interconnected such that the reciprocating-piston engine can be operated in a generator operating mode. Alternatively, the power control element is designed and interconnected such that the reciprocating-piston engine can be operated switchably either in an electric-motor operating mode or in a generator operating mode. In the electric-motor operating mode, the crankshaft can be driven with electric motor action with adjustable power by virtue of the electrical energy store being discharged, and by virtue of at least one of the electromechanical converters being supplied with current from the electrical energy store and being operated as an electric motor with adjustable mechanical output power. The adjustment of the power is performed in particular in continuously variable fashion. In the generator operating mode, the electrical energy store can be charged with adjustable power by virtue of the crankshaft being mechanically driven, in particular by virtue of the crankshaft being driven with combustion engine action by way of the reciprocating-piston engine or by virtue of the crankshaft being driven by external action, for example by way of the vehicle wheels during the deceleration of the vehicle, and by virtue of a current for charging the electrical energy store being picked off at least from one of the electromechanical converters and said at least one electromechanical converter being operated as a generator with adjustable electrical power.

The power control element is electrically interconnected with the electrical energy store, with the first electromechanical converter, with the third electromechanical converter and with the crankshaft sensor, in particular also with the second electromechanical converter and/or with the fourth electromechanical converter, and designed, in particular programmed, such that the power can be distributed to the first electromechanical converter, in particular also to the second electromechanical converter, with a first power fraction, and to the third electromechanical converter, in particular also to the fourth electromechanical converter, with a second power fraction. Thus, the first power fraction is assigned to the first connecting-rod bearing and the second power fraction is assigned to the second connecting-rod bearing. The weighting of the two power fractions, in other words the fraction of the variable power made up by the first power fraction and that made up by the second power fraction, is thus likewise variable by way of the power control element.

The power control element is designed such that the distribution of the power to the first electromechanical converter and to the third electromechanical converter is performed in a manner dependent on the position of the crankshaft. In other words, the power control element is designed such that the weighting of the two power fractions, that is to say the fraction of the variable power made up by the first power fraction and that made up by the second power fraction, is realized by way of the power control element in a manner dependent on the position of the crankshaft.

It is thus possible for the torque applied, or picked off, at the first connecting-rod bearing and at the second connecting-rod bearing by way of the electromechanical converter, and/or the lateral force thereby applied to the crankshaft in a direction perpendicular to the crankshaft axis, to be controlled in a manner dependent on the position of the crankshaft. The latter are possible in particular if the electromechanical converters are designed such that the respective magnetic field exerts a lateral force on the crankshaft at the respective connecting-rod bearings, in particular if the inner and/or outer magnetic field units do not fully surround the crankshaft but surround the crankshaft in particular only on one side, in particular with a surround angle of less than 360° or 270°. This is the case in particular if the inner magnetic field units each have the shape of a circular-arc-shaped inner ring section which surrounds the respective crank webs, and the respective circular-arc-shaped inner ring section extends with a first center angle of less than 360° or 270°, and/or if the outer magnetic field units each have the shape of a circular-arc-shaped outer ring section which surrounds the first circular path of the first inner magnetic field unit with a radial spacing, and the respective circular-arc-shaped outer ring section extends with a second center angle of less than 360° or 270°. The non-surrounding section of the magnetic field unit preferably points toward the respective piston or away from said piston.

In the case of the crankshaft being incompletely surrounded in this way, the magnetic field units, when outputting power or absorbing power, exert a lateral force on the crankshaft perpendicular to the crankshaft axis. Said lateral force can be utilized to reduce or compensate generated inertia forces and torques of relatively high order, in particular of second order, on the crankshaft. In particular, wobbling torques which act on the crankshaft in a direction parallel to the reciprocating movement of the pistons, for example in the case of a four-cylinder in-line engine, can be compensated. Therefore, a refinement of the invention provides that the distribution of the power is performed in a manner dependent on the position of the crankshaft in such a way that inertia forces and torques of relatively high order, in particular of second order, in particular wobbling torques in a direction perpendicular to the crankshaft axis, arising as a result of the movement of the crankshaft, of the at least one first connecting rod, of the at least one second connecting rod, of the first piston and/or of the second piston are reduced or compensated.

In a refinement of the abovementioned system, the system comprises a vibration sensor which is coupled to the reciprocating-piston engine and which serves for the detection of vibrations in the reciprocating-piston engine, in particular in the crankcase and/or in the crankshaft and/or in the connecting-rod bearings. In particular, the vibration sensor may be an acoustic sensor, for example a microphone. Such sensors for detecting vibrations in a reciprocating-piston engine are known from the prior art for example in the form of so-called knock sensors. The vibrations are generated in particular by imbalanced inertia forces and torques of relatively high order, in particular of second order. Imbalanced inertia forces and torques of relatively high order are caused, depending on the construction of the reciprocating-piston engine, by the movement of the crankshaft, of the at least one first connecting rod, of the at least one second connecting rod, of the first piston and/or of the second piston. The power control element is electrically interconnected not only with the electrical energy store, with the first electromechanical converter, with the third electromechanical converter and with the crankshaft sensor but also with the vibration sensor, and designed, such that the distribution of the power to the first electromechanical converter and to the third electromechanical converter is performed also in a manner dependent on the detected vibrations. According to the invention, the distribution of the power to the first electromechanical converter and to the third electromechanical converter is thus performed in particular for the purposes of reducing or compensating the generated inertia forces and torques of relatively high order, in particular of second order, in a manner dependent on the vibration detected by way of the vibration sensor. For example, the distribution is varied by way of the power control element until the detected vibrations are reduced, preferably minimized.

BRIEF DESCRIPTION OF THE DRAWINGS

The reciprocating-piston engine according to the invention and the systems according to the invention will be described in more detail below, merely by way of example, on the basis of specific exemplary embodiments illustrated schematically in the drawings.

In detail, in the drawings.

DETAILED DESCRIPTION

Since the figures show, in part, the same exemplary embodiment from different views and in different degrees of detail, and the exemplary embodiments, in part, differ only by certain features, the following description of the figures will, in part, not provide a repeated explanation of reference designations and features that have already been mentioned previously, and, in part, only the differences between the individual exemplary embodiments will be discussed.

FIGS. 1a to 1j illustrate a first exemplary embodiment of the reciprocating-piston engine according to the invention from different views and in different degrees of detail. Said figures will be discussed jointly below.

Figure 1A:
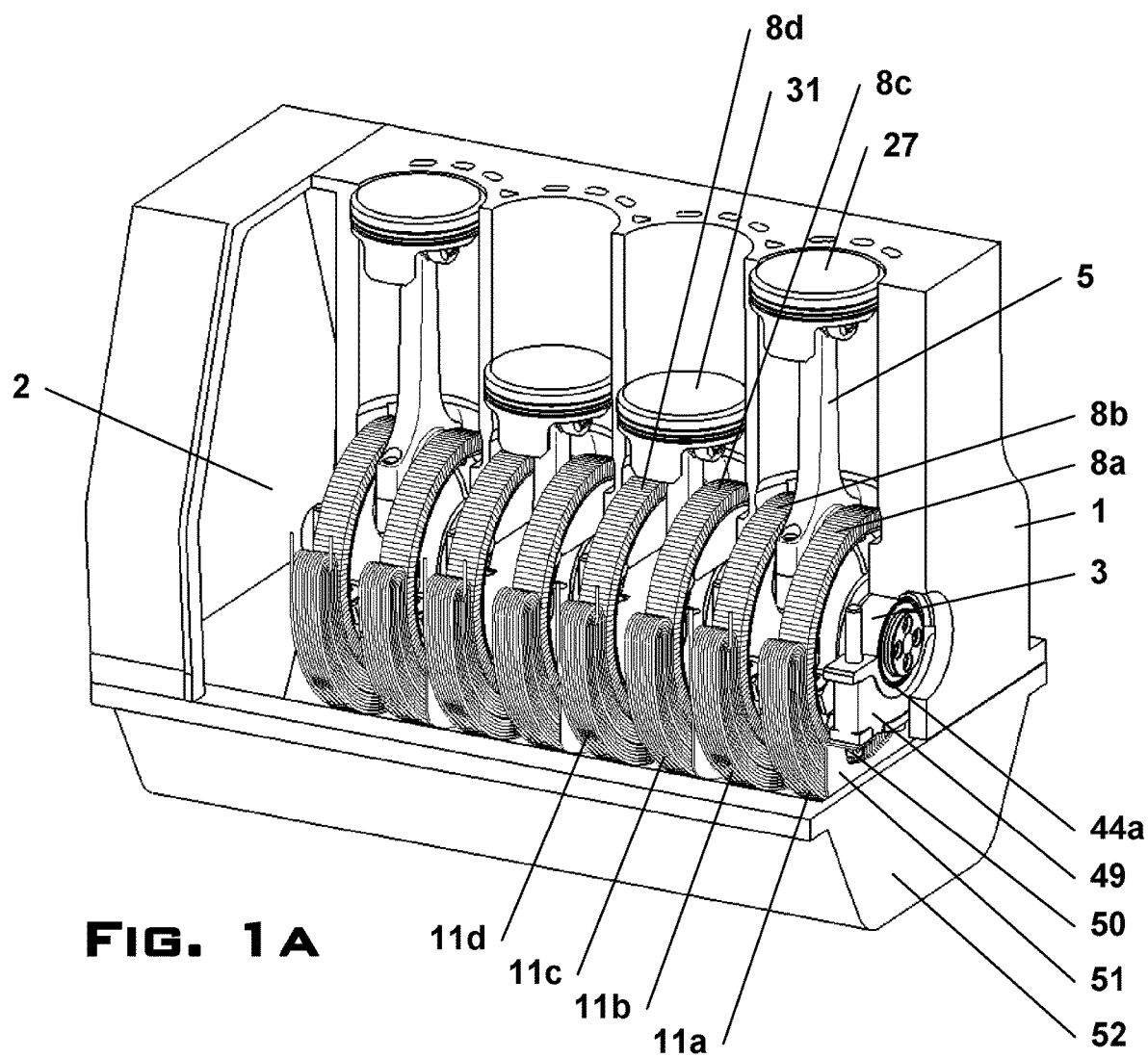
FIG. 1a shows, in an oblique view, a first exemplary embodiment of the reciprocating-piston engine according to the invention with closed ring-shaped inner permanent magnet units and circular-arc-shaped outer coil units.
Figure 1B:
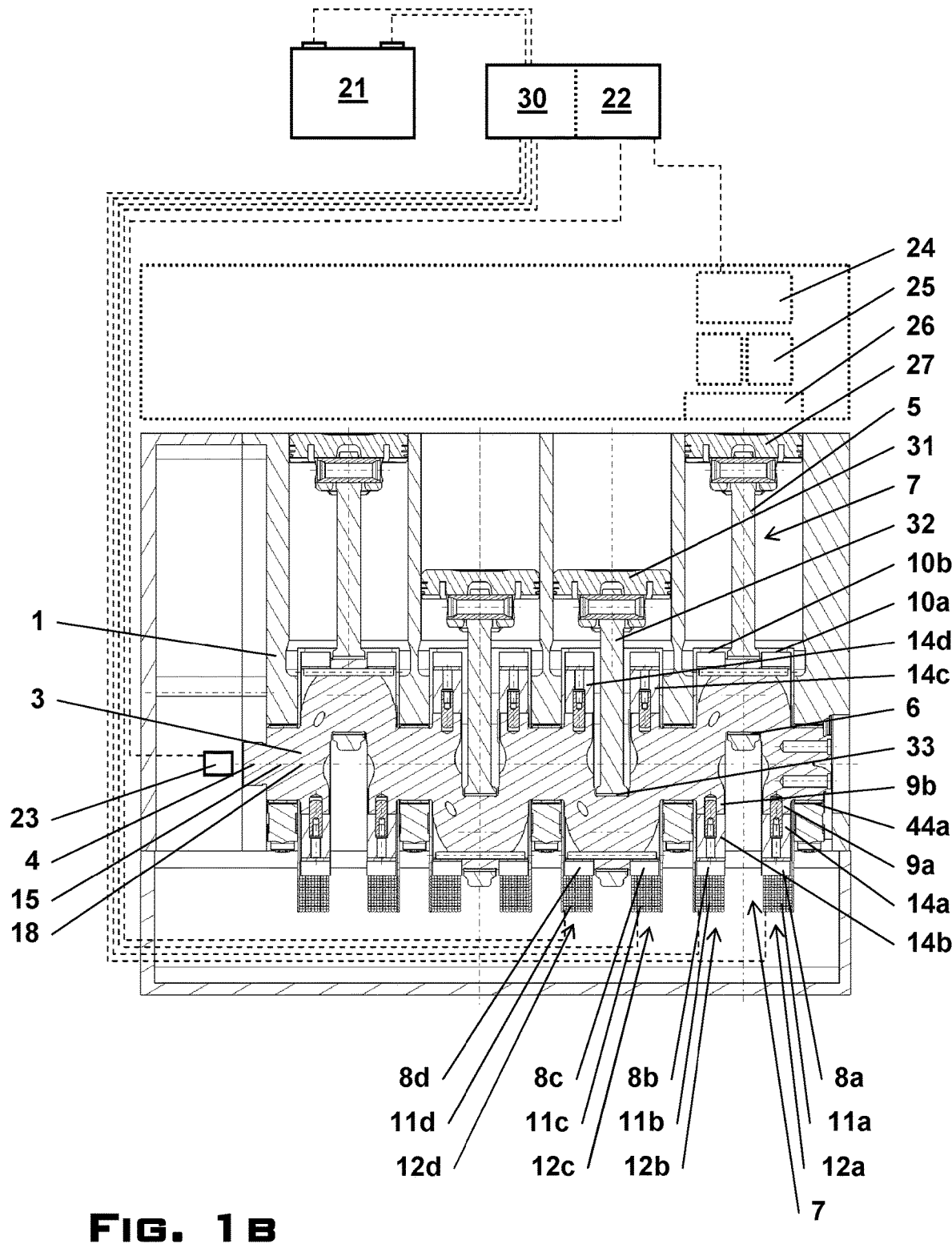
FIG. 1b shows, in a cross-sectional view from a front elevation, the first exemplary embodiment incorporated into a system.

The reciprocating-piston engine of the first exemplary embodiment is a four-cylinder in-line engine which operates on the basis of the Otto-cycle engine principle, as shown in FIGS. 1a and 1b. The reciprocating-piston engine is assembled substantially from a cylinder block 1, a crank chamber 2 which is formed partially in the cylinder block 1 and which is delimited at the bottom by an oil pan 52, a crankshaft 3, and four pistons 27 and 31, which are connected to the crankshaft 3 by way of four connecting rods 5 and 32. Below, for simplicity, a partial description will be given of only the first piston 27 and the second piston 31 and the peripherals thereof.

The crankshaft 3 is arranged within the crank chamber 2, so as to be rotatable about a geometric crankshaft axis 4, in a total of five main bearings 44a and 44b, and is held there by way of five bearing covers 49, which are fixed to the cylinder block 1 by way of bearing cover screws 50, as illustrated in FIG. 1a.

The crankshaft 3 is formed in one piece from a magnetizable material.

The first connecting rod 5 is mounted rotatably in a first connecting-rod bearing 6 of the crankshaft 3 and, during rotation of the crankshaft 3, performs a connecting-rod movement in a geometric connecting-rod movement space 7. The first piston 27 is mounted in a connecting-rod eye of the first connecting rod 5, as shown in FIGS. 1*a* and 1*b*.

The second connecting rod 32 is mounted rotatably in a second connecting-rod bearing 33 of the crankshaft 3 and, during rotation of the crankshaft 3, likewise performs a connecting-rod movement in a geometric connecting-rod space.

The same applies to the further connecting rods, connecting-rod bearings and pistons. Below, the arrangement thereof will be described, in part, merely on the basis of the first connecting rod 5, the first connecting-rod bearing 6 and the first piston 27.

Figure 1C:
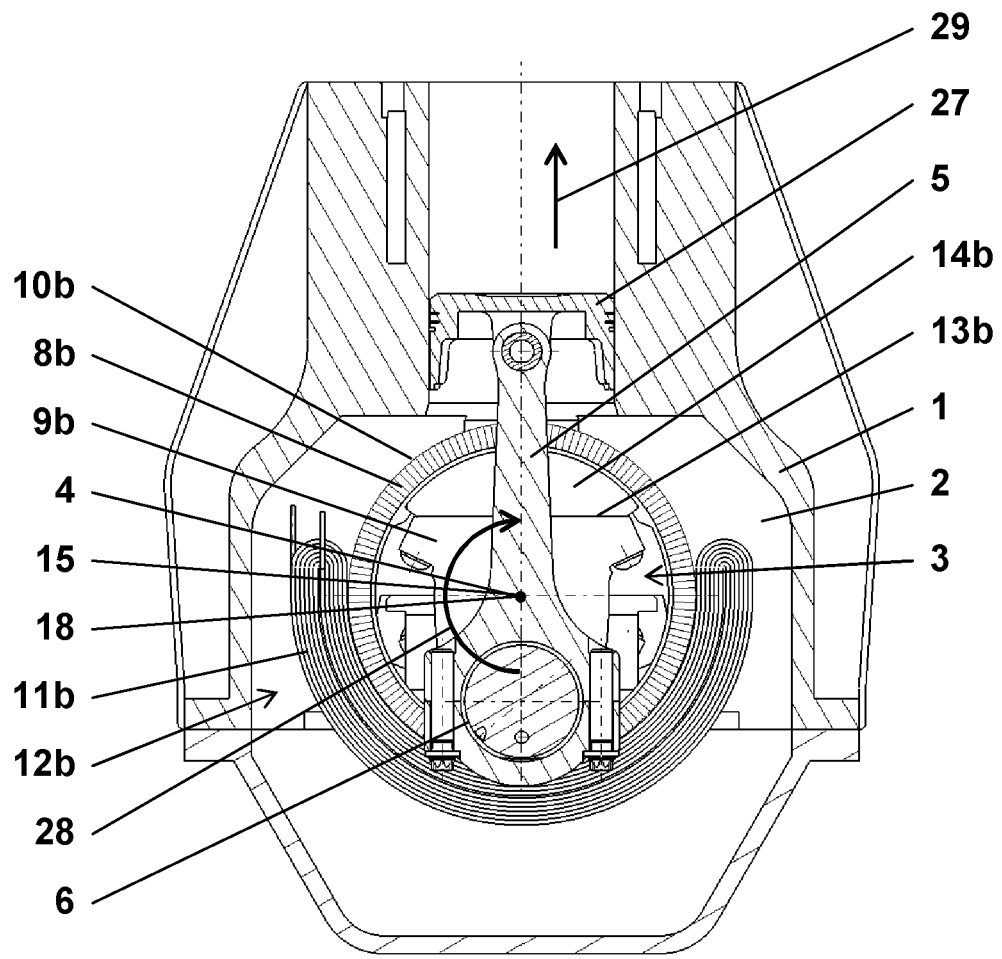
FIG. 1c shows, in a cross-sectional view from a side elevation, the first exemplary embodiment with the piston at bottom dead center.
Figure 1D:
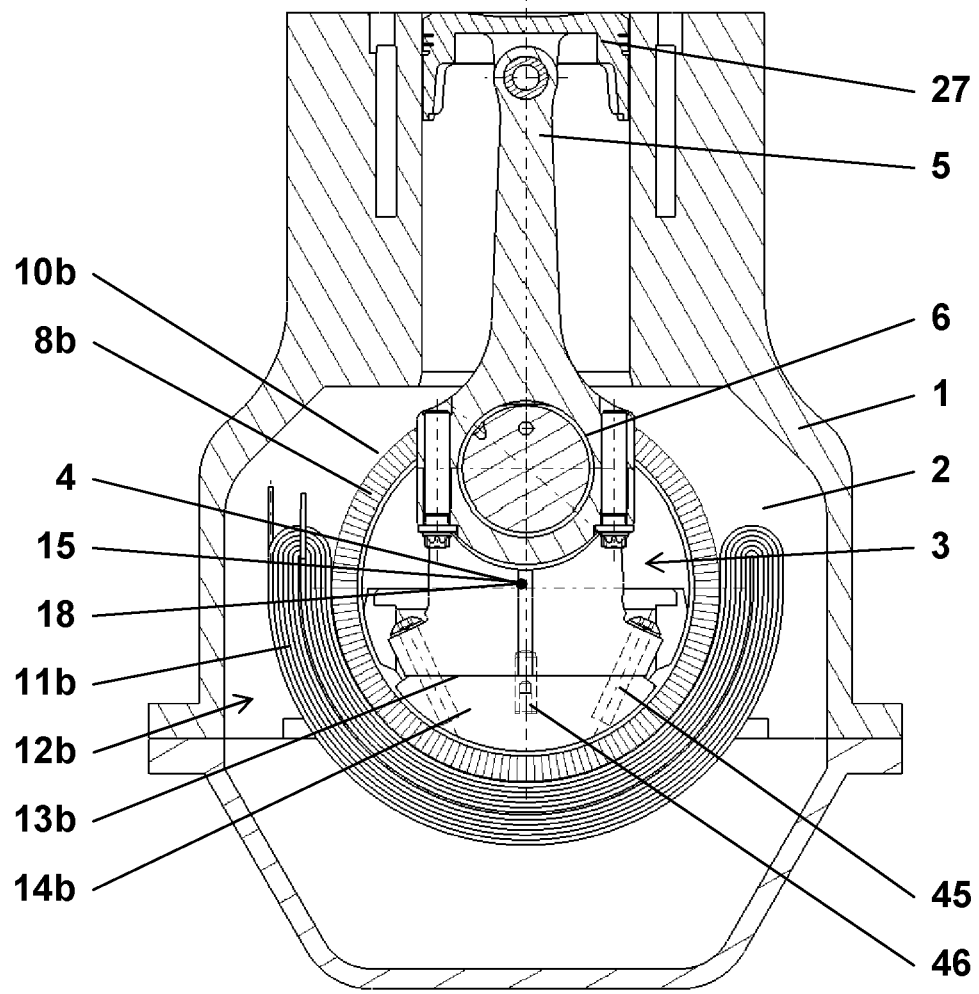
FIG. 1d shows, in a cross-sectional view from a side elevation, the first exemplary embodiment with the piston at top dead center.
Figure 1E:
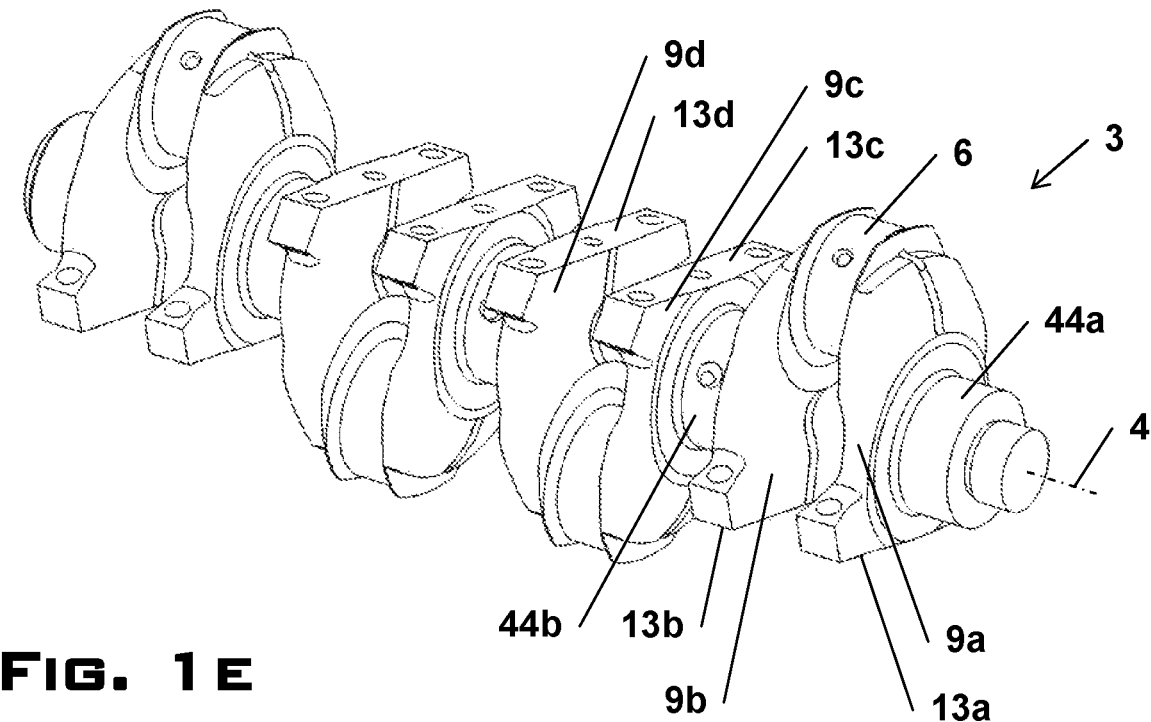
FIG. 1e shows, in an oblique view, the crankshaft of the first exemplary embodiment without balancing weights.

The first connecting-rod bearing 6 of the crankshaft 3 is connected via a first crank web 9*a* to the adjacent first main bearing 44*a* and via a second crank web 9*b*, which is situated opposite the first crank web 9*a*, to the second main bearing 44*b*, wherein the crank webs 9*a* and 9*b* give rise to the radial offset of the first connecting-rod bearing 6 in relation to the crankshaft axis 4, as shown in FIG. 1*e*.

The first crank web 9*a* has a first fastening surface 13*a* on a side which points radially outward in relation to the crankshaft axis 4 and which is situated opposite the first connecting-rod bearing 6. Also, the second crank web 9*b* has a second fastening surface 13*b* on a side which points radially outward in relation to the crankshaft axis 4 and which is situated opposite the first connecting-rod bearing 6, as illustrated in FIG. 1*e*. The fastening surfaces 13*a* and 13*b*, which are situated opposite the first connecting-rod bearing 6, are planar and lie in a common plane. Correspondingly, in each case two fastening surfaces are also situated opposite the other connecting-rod bearings of the crankshaft 3, such as for example the third fastening surface 13*c* situated opposite the second connecting-rod bearing 33 on the third crank web 9*c*, and the fourth fastening surface 13*c* situated opposite the second connecting-rod bearing 33 on the fourth crank web 9*d*, corresponding to FIG. 1*e*.

Figure 1F:
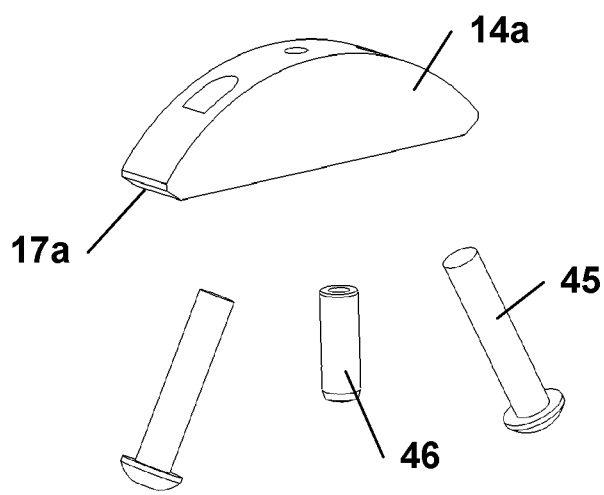
FIG. 1f shows, in an oblique view, a balancing weight of the first exemplary embodiment.
Figure 1G:
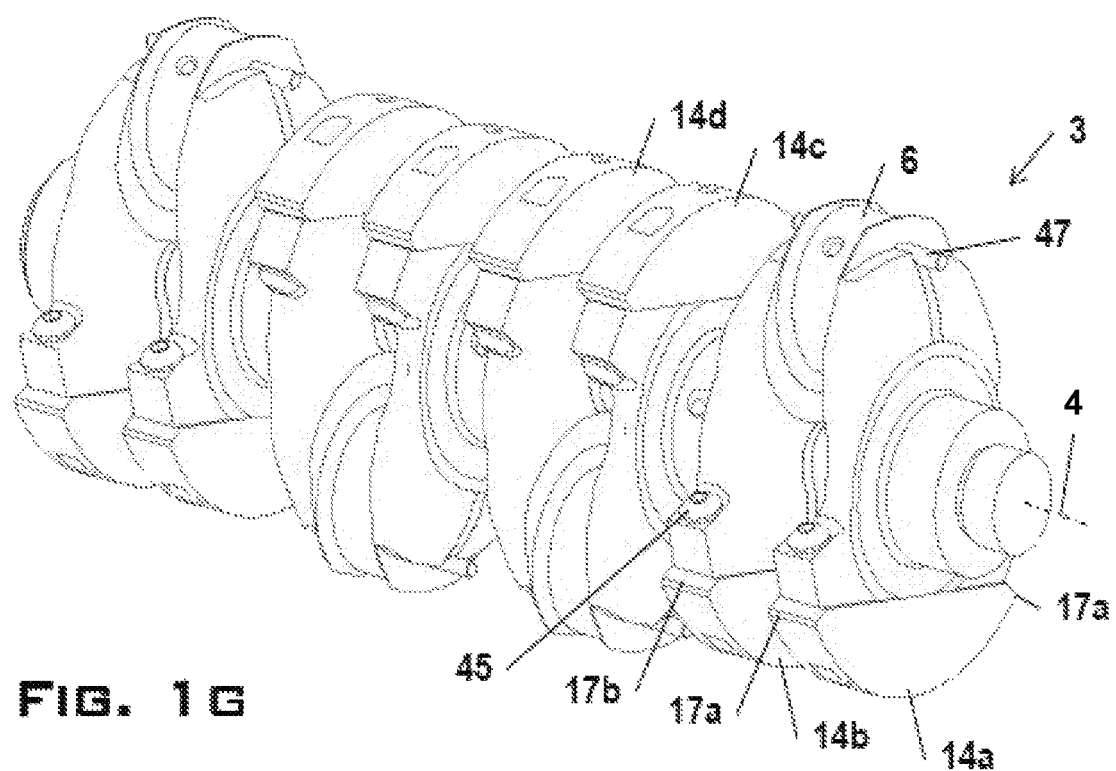
FIG. 1g shows, in an oblique view, the crankshaft of the first exemplary embodiment with balancing weights.

A first balancing weight 14*a* is fixed in positively locking fashion in a radial direction to the first fastening surface 13*a*, a second balancing weight 14*b* is fixed in positively locking fashion in a radial direction to the second fastening surface 13*b*, a third balancing weight 14*c* is fixed in positively locking fashion in a radial direction to the third fastening surface 13*c*, and a fourth balancing weight 14*d* is fixed in positively locking fashion in a radial direction to the fourth fastening surface 13*d*. The same applies to the other fastening surfaces. The positively locking fixing of the balancing weights 14*a*, 14*b*, 14*c* and 14*d* to the fastening surfaces 13*a*, 13*b*, 13*c* and 13*d* is realized in each case by way of two balancing-weight screws 45, wherein the respective balancing weight 14*a*, 14*b*, 14*c* and 14*d* is centered on the respective fastening surface 13*a*, 13*b*, 13*c* and 13*d* by way of a centering bolt 46, as shown in FIGS. 1*f* and 1*g*. The balancing weights 14*a*, 14*b*, 14*c* and 14*d* are, like the other balancing weights, composed of a non-magnetizable material, for example cast iron, high-grade steel, carbon fiber, a ceramic material or aluminum. All of the balancing weights correspond to one another.

A first inner magnetic field unit 8*a* is arranged on a side, which points radially outward in relation to the crankshaft axis 4, of the first balancing weight 14*a*. Thus, the first inner magnetic field unit 8*a* is arranged, indirectly via the first balancing weight 14*a*, on the first crank web 9*a*, which is axially adjacent to the first connecting-rod bearing 6, of the crankshaft 3, as shown in FIGS. 1*b* and 1*h*.

Corresponding to this arrangement, a second inner magnetic field unit 8*b* is arranged on the second crank web 9*b*, which is axially adjacent to the first connecting-rod bearing 6 and situated axially opposite the first crank web 9*a*, of the crankshaft 3 by virtue of the second inner magnetic field unit 8*b* being fixed to that side of the second balancing weight 14*b* which points radially outward.

Figure 1H:
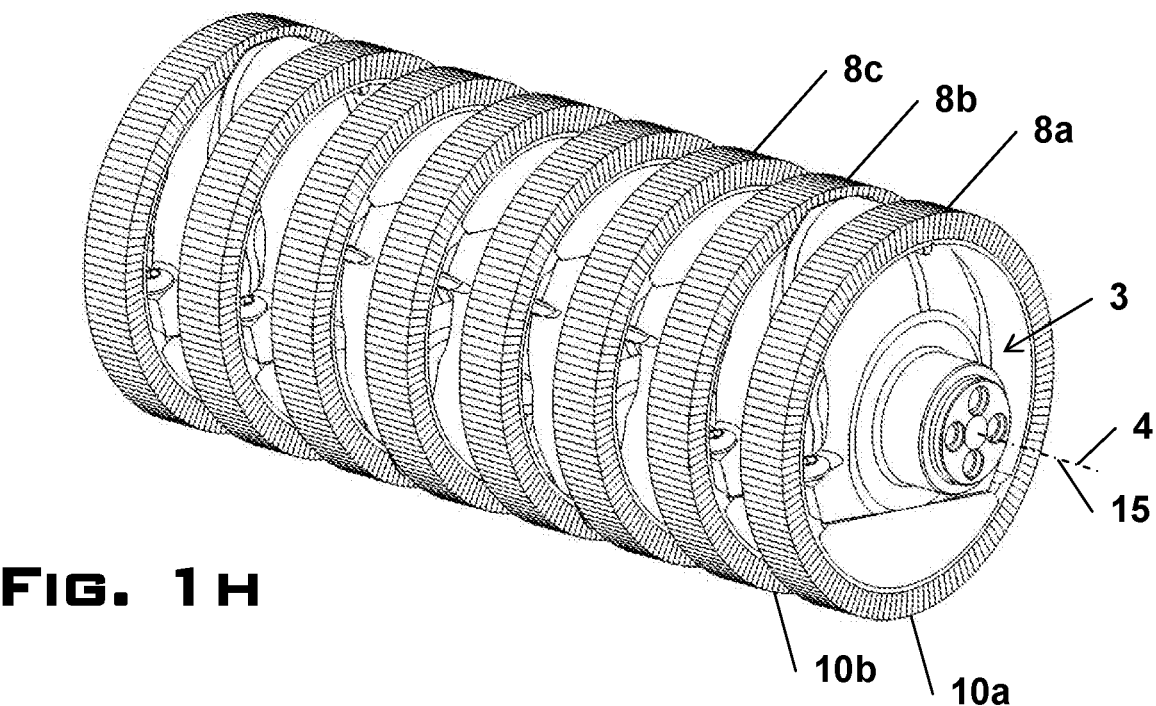
FIG. 1h shows, in an oblique view, the crankshaft of the first exemplary embodiment with balancing weights and the ring-shaped inner permanent magnet units.

Accordingly, inner magnetic field units, for example a third magnetic field unit 8*c*, are also arranged on the other balancing weights, as is likewise shown in FIGS. 1*b* and 1*h*.

Figure 1I:
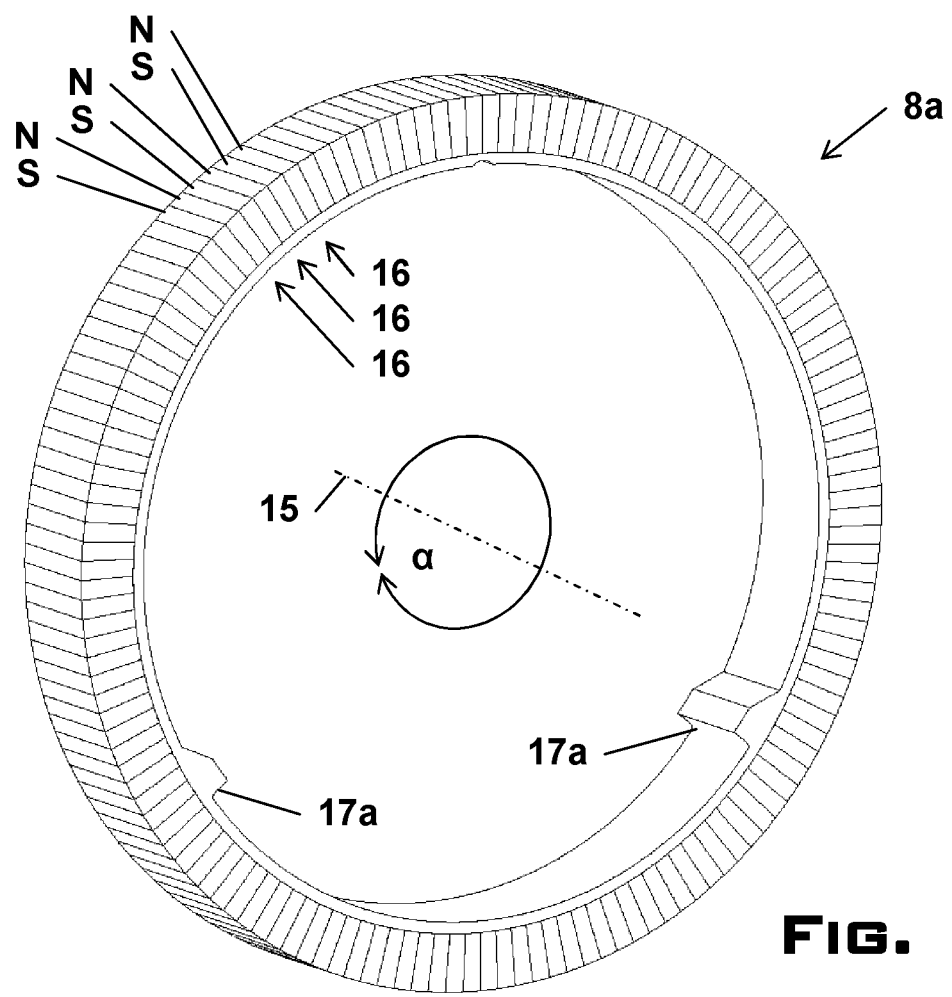
FIG. 1i shows, in an oblique view, the ring-shaped inner permanent magnet unit of the first exemplary embodiment with first permanent magnets arranged adjacent to one another with north poles pointing in a common circumferential direction.

The inner magnetic field units 8*a*, 8*b* and 8*c* are in each case pushed into a first linear guide 17*a* or second linear guide 17*b* or third linear guide 17*c*, respectively, which extends in an axial direction, that is to say parallel to the crankshaft axis 4, on the respective balancing weight 14*a* or 14*b* or 14*c*, and are fixed axially there such that said inner magnetic field units cannot be displaced, as is shown in FIGS. 1*b* and 1*h*. The linear guides 17*a*, 17*b* and 17*c* fix the respective inner magnetic field unit 8*a*, 8*b* or 8*c* in a radial direction in relation to the crankshaft axis 4, that is to say outward in a centrifugal direction, and in a circumferential direction, that is to say rotationally, in positively locking fashion by way of an undercut. A detailed view of the first linear guide 17*a*, which is formed in the first inner magnetic field unit 8*a* and the first balancing weight 14*a*, is shown in FIGS. 1*f*, 1*g* and 1*i*. The second linear guide 17*b* of the second balancing weight 14*b* is shown in FIG. 1*g*.

The first inner magnetic field units 8*a*, 8*b* and 8*c* have the shape of a closed circular inner ring which surrounds the respective crank web 9*a*, 9*b* or 9*c* and which has a geometric first axis 15 which lies on the crankshaft axis 4. In other words, said first inner magnetic field units have the shape of a circular-arc-shaped inner ring section which surrounds the respective crank web 9*a*, 9*b* or 9*c* and which has a common geometric first axis 15 which lies on the crankshaft axis 4, wherein the circular-arc-shaped inner ring section extends with a first center angle α of 360°, such that the respective circular arc is closed to form a ring, as shown in FIG. 1*i*.

For better stabilization of all of the ring-shaped inner magnetic field units 8*a*, 8*b* and 8*c*, these are each connected to the respective connecting-rod bearing 6 by way of stabilizing bolts 47, FIG. 1*g*.

All of the inner magnetic field units, eight inner magnetic field units in the present exemplary embodiment, correspond to one another, FIG. 1*h*.

The inner magnetic field units 8*a*, 8*b* and 8*c* are permanently magnetic and are each in the form of an inner permanent magnet unit 8*a*, 8*b* and 8*c* respectively. Accordingly, the first inner permanent magnet unit 8*a* has, in relation to the crankshaft axis 4, a multiplicity of first permanent magnets 16 arranged in a line with one another in a circle-circumferential direction, wherein said first permanent magnets 16 are arranged adjacent to one another along the circular inner ring and have north poles N pointing in a common circumferential direction, such that the magnetic polarity of the first permanent magnets 16 alternates in the circle-circumferential direction, such that a magnetic alternating field is generated during rotation of the crankshaft 3, as shown in FIG. 1*i*. In other words, the permanent magnet units 8*a*, 8*b* and 8*c* are formed by magnet rings which, along the ring circumference, have a multiplicity of alternating magnetic north poles N and south poles S, such that north poles N and south poles S alternate with one another in the circle-circumferential direction.

Thus, the first inner magnetic field unit 8a, the second inner magnetic field unit 8b and the third inner magnetic field unit 8c point radially outward in relation to the crankshaft axis 4. Furthermore, during rotation of the crankshaft 3, said inner magnetic field units circulate around the crankshaft axis 4, in each case on a geometric circular path which is axially adjacent to the connecting-rod movement space 7; specifically, the first inner magnetic field unit 8a circulates on the first circular path 10a, and the second inner magnetic field unit 8b circulates on the second circular path 10b, as shown in FIGS. 1b and 1h.

The connecting-rod movement space 7 of the first connecting rod 5 is situated in the axial intermediate space between the first circular path 10a and the second circular path 10b, as indicated in FIG. 1b. This applies correspondingly to the other connecting rods.

A first outer magnetic field unit 11a is arranged in static fashion in the crank chamber 2 so as to be radially spaced apart from the first circular path 10a of the ring-shaped first inner permanent magnet unit 8a. A second outer magnetic field unit 11b is provided, likewise in static fashion, in the crank chamber 2 so as to be parallel to and spaced apart from the first outer magnetic field unit 11a, which second outer magnetic field unit surrounds the second circular path 10b of the ring-shaped second inner permanent magnet unit 8b with a radial spacing, as indicated in FIGS. 1a, 1b, 1c and 1d. Accordingly, each inner permanent magnet unit is assigned an outer magnetic field unit.

Figure 1J:
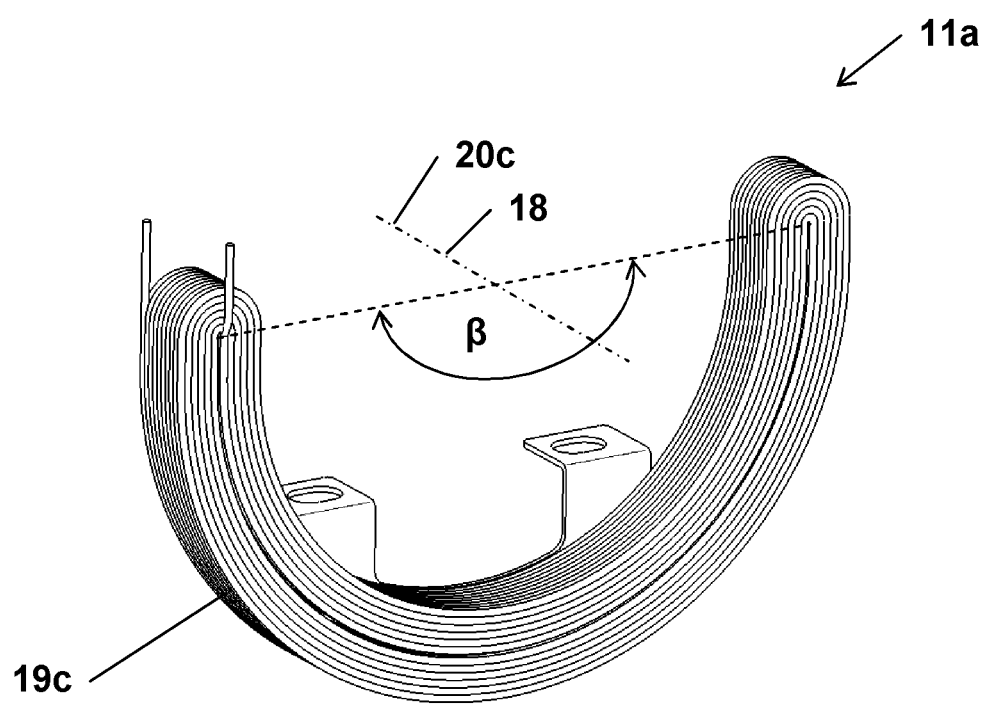
FIG. 1j shows, in an oblique view, the circular-arc-shaped outer coil unit of the first exemplary embodiment, having a second center angle of 180°, with a second coil with a second coil axis running parallel to the crankshaft axis.

All of the outer magnetic field units 11a, 11b, 11c and 11d have the shape of a circular-arc-shaped outer ring section which surrounds the respective circular path of the respective inner magnetic field unit 8a, 8b, 8c and 8d and which has a geometric second axis 18 which lies on the crankshaft axis 4, FIGS. 1a, 1c, 1d and 1j. Said respective circular-arc-shaped outer ring section has a second center angle β of 180°, as illustrated in FIG. 1j.

All of the outer magnetic field units 11a, 11b, 11c and 11d are electromagnetic and are in the form of outer coil units 11a, 11b, 11c and 11d respectively. These have in each case one second coil 19c, the second coil axis 20c of which runs parallel to the crankshaft axis 4, FIG. 1j.

The first inner permanent magnet unit 8a and the first outer coil unit 11a are thus arranged and designed such that, together, they form a first electromechanical converter 12a. During rotation of the crankshaft 3 and thus also of the first inner permanent magnet unit 8a, a magnetic alternating field is generated in the first outer coil unit 11a, whereby an alternating voltage is induced in the second coil 19c. Said voltage may for example be utilized for charging an electrical energy store. The first electromechanical converter 12a is, in this case, an electrical generator.

Conversely, by application of an alternating voltage to the second coil 19c of the first outer coil unit 11a, a magnetic force can be exerted on the first inner permanent magnet unit 8a, such that the first inner permanent magnet unit 8a and thus also the crankshaft 3 can be set in rotation. In this case, the first electromechanical converter 12a forms an electric motor.

A corresponding situation applies to the second inner permanent magnet unit 8a and the second outer coil unit 11a, to the third inner permanent magnet unit 8a and the third outer coil unit 11a, and to the fourth inner permanent magnet unit 8a and the fourth outer coil unit 11a, which form a second electromechanical converter 12b, a third electromechanical converter 12c and a fourth electromechanical converter 12d respectively.

The reciprocating-piston engine has an electrically actuable variable outlet valve drive 24 for a first outlet valve 25 which is assigned to a first combustion chamber 26 of the first piston 27, and for each further outlet valve of the other pistons. The variable outlet valve drive 24 is designed such that the first outlet valve 25 and each further outlet valve can be opened independently of the position of the crankshaft 3.

The reciprocating-piston engine is incorporated into a system which is schematically indicated in FIG. 1b and which comprises a chargeable and dischargeable electrical energy store 21, an electrical control unit 22, an electrical power control element 30, and a crankshaft sensor 23 for detecting an angular position of the crankshaft 3.

The control unit 22 is electrically interconnected with the electrical energy store 21, with the first electromechanical converter 12a, with the second electromechanical converter 12b and with all further electromechanical converters. Furthermore, the control unit 22 is designed such that the reciprocating-piston engine can be switched between an electric-motor operating mode and a generator operating mode. In the electric-motor operating mode, the crankshaft 3 is driven with electric motor action by virtue of the electrical energy store 21 being discharged. In the generator operating mode, the electrical energy store 21 is charged by virtue of the crankshaft 3 being mechanically driven, for example by virtue of the crankshaft 3 being driven with combustion engine action by way of the reciprocating-piston engine, or by virtue of the crankshaft 3 being driven by external action.

The control unit 22 is interconnected with the crankshaft sensor 23 and with the variable outlet valve drive 24, and is designed, such that, in the electric-motor operating mode, the first outlet valve 25 is open in a position range 28 of the crankshaft 3 in which the first piston 27 is situated in a compression stroke 29, illustrated by the arrows 28 and 29 in FIG. 1c. The compression stroke in that position range 28 of the crankshaft 3 in which the first piston 27 performs a movement 29 from bottom dead center of the first piston 27, illustrated in FIG. 1c, in the direction of top dead center of the first piston 27, illustrated in FIG. 1d. A corresponding situation applies to the other pistons and to the outlet valves assigned thereto.

By way of said measure, it is achieved that, in the electric-motor operating mode, no compression has to take place in the respective combustion chamber 26, and the drag torque of the reciprocating-piston engine can be reduced.

The power control element 30 is electrically interconnected with the electrical energy store 21, with the first electromechanical converter 12a, with the second electromechanical converter 12b, with the third electromechanical converter 12c, with the fourth electromechanical converter 12d, and with each further electromechanical converter. The power control element 30 is furthermore designed such that, in the electric-motor operating mode, the crankshaft 3 can be driven with electric motor action with adjustable power by virtue of the electrical energy store 21 being discharged, and in the generator operating mode, the electrical energy store 21 can be charged with adjustable power by virtue of the crankshaft 3 being mechanically driven.

The power control element 30 may be a functional constituent part of the control unit 22 and vice versa.

The power control element 30 is electrically interconnected with the electrical energy store 21, with all of the electromechanical converters and with the crankshaft sensor 23, and designed, such that the power can be distributed to the electromechanical converter pairs 12a and 12b, 12c and 12d etc., which are assigned to in each case one piston, with different power fractions, such that the pistons can be assigned different levels of electrical power. The distribution of the power to the converter pairs 12a and 12b, 12c and 12d, etc., is performed in a manner dependent on the position of the crankshaft 3. In particular, the distribution of the power is performed in a manner dependent on the position of the crankshaft 3, in such a way that inertia forces and inertia torques of relatively high order, in particular of second order, arising as a result of the movement of the crankshaft 3, of all of the connecting rods and of all of the pistons, are reduced or compensated, as described in the introduction.

Figure 2A:
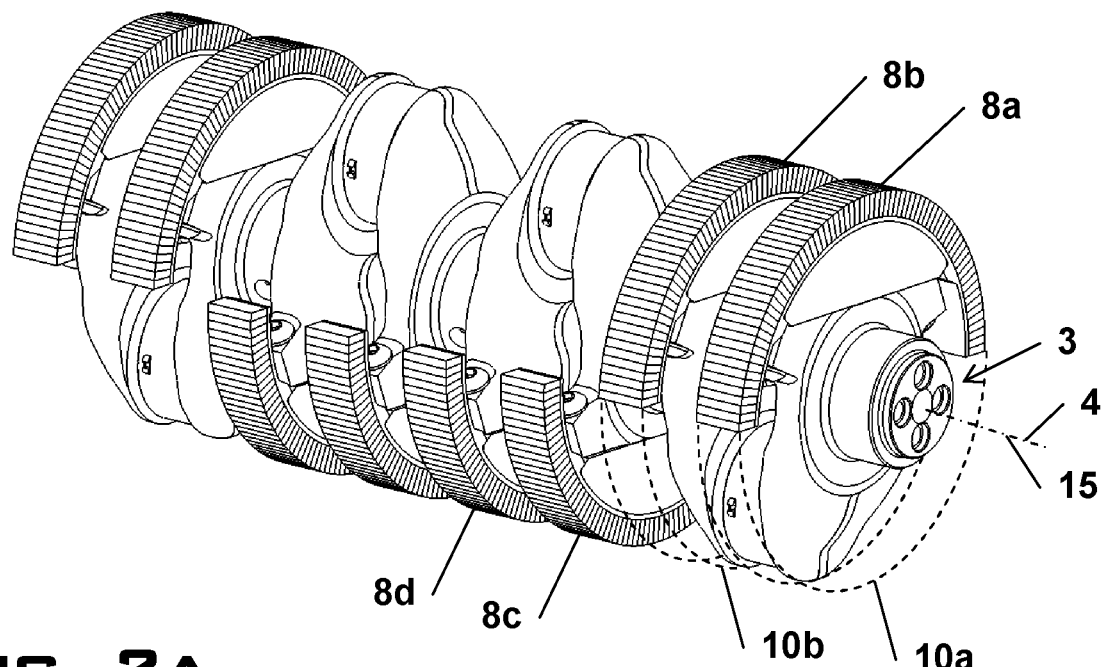
FIG. 2a shows, in an oblique view, a first alternative embodiment of the crankshaft with circular-arc-shaped inner permanent magnet units with a first center angle of 180°.
Figure 2B:
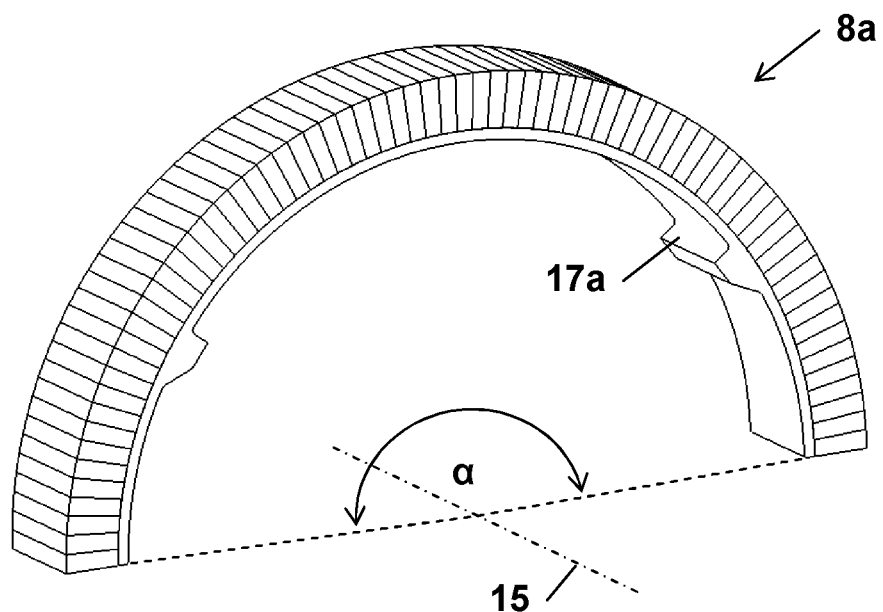
FIG. 2b shows, in an oblique view, the circular-arc-shaped inner permanent magnet unit of the first alternative embodiment of the crankshaft with a first center angle of 180°.

FIGS. 2a and 2b illustrate a first alternative embodiment of the crankshaft 3. In this alternative embodiment, instead of the shape of a closed circular inner ring which surrounds the respective crank web 9a, 9b, 9c and 9d, as in the first embodiment of FIGS. 1a to 1j, all inner permanent magnet units 8a, 8b, 8c and 8d have the shape of a circular-arc-shaped inner ring section which surrounds the respective crank web. Said open ring section has a semicircular shape with a geometric first axis 15 which lies on the crankshaft axis 4. Thus, the circular-arc-shaped inner ring section has a first center angle α of 180°, as shown in FIGS. 2a and 2b. During rotation of the crankshaft 3, the inner permanent magnet units 8a and 8b circulate around the crankshaft axis 4 on geometric first circular paths 10a and 10b respectively, which are illustrated by way of dashed lines in FIG. 2a.

FIGS. 3a to 3d show a second exemplary embodiment of the reciprocating-piston engine according to the invention with closed ring-shaped inner permanent magnet units 8a, 8b, 8c and 8d, and circular-arc-shaped outer coil units 11a, 11b, 11c and 11d.

As is also the case in the preceding, first exemplary embodiment of FIGS. 1a to 1j, the inner magnetic field units are permanently magnetic and are in the form of first inner permanent magnet units 8a, 8b, 8c and 8d. The latter are each in the shape of a closed circular inner ring which surrounds the respective crank web.

Figure 3A:
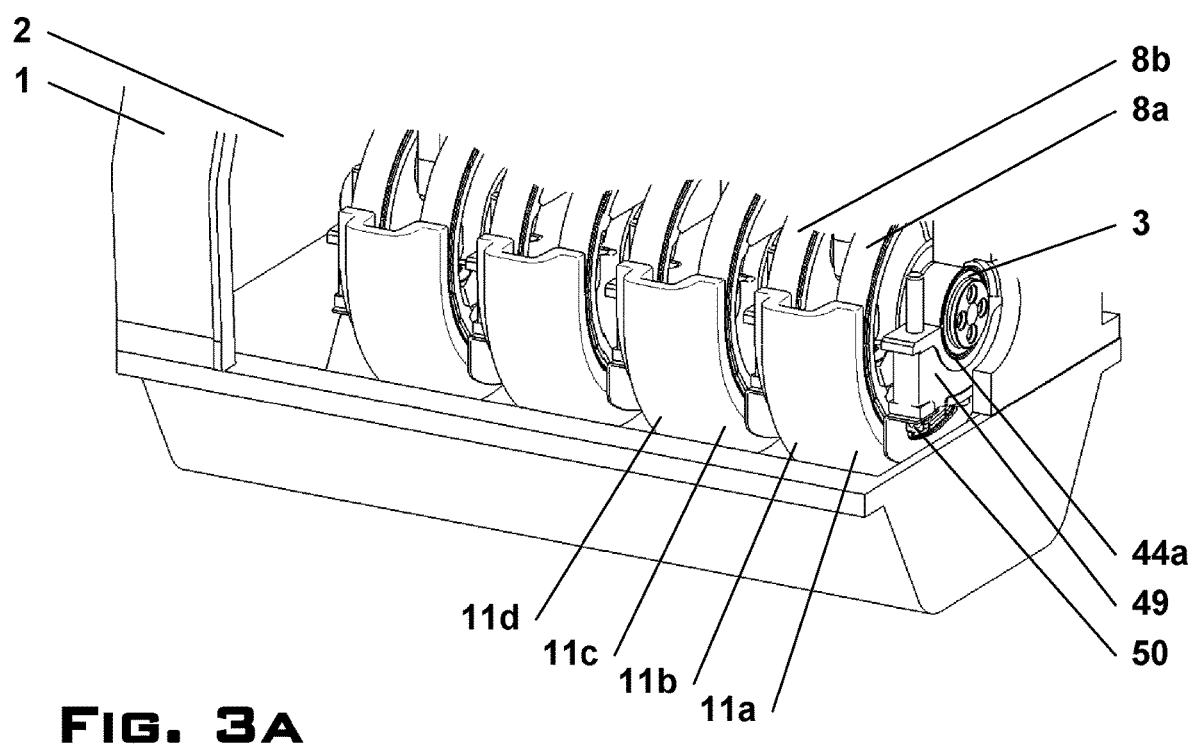
FIG. 3a shows, in an oblique view, a second exemplary embodiment of the reciprocating-piston engine according to the invention with closed ring-shaped inner permanent magnet units and circular-arc-shaped outer coil units.
Figure 3B:
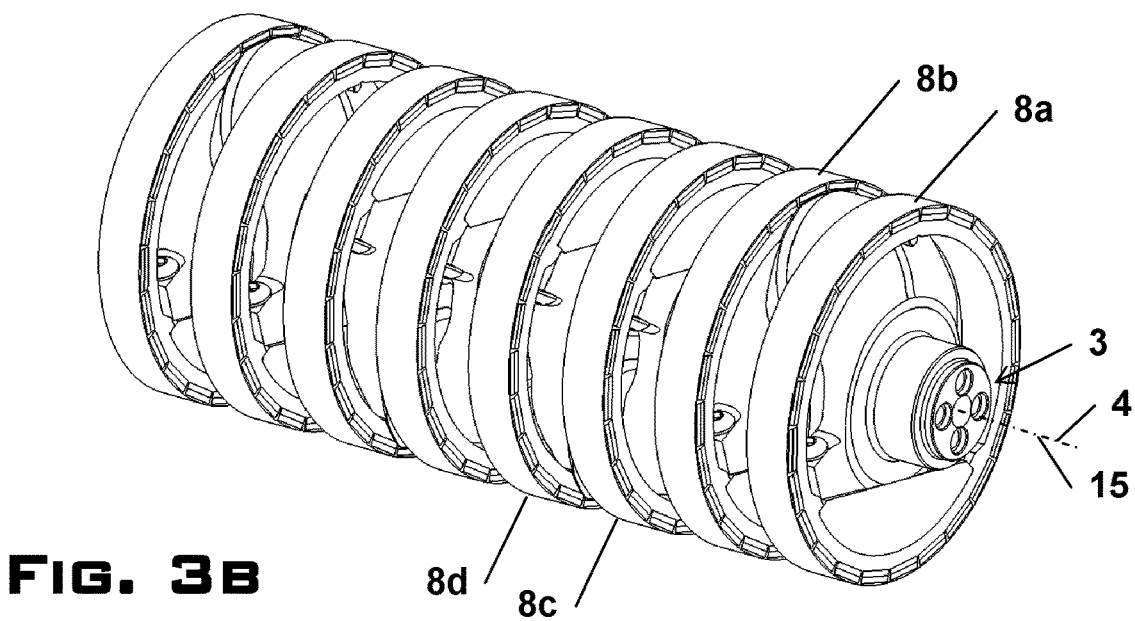
FIG. 3b shows, in an oblique view, the crankshaft of the second exemplary embodiment with balancing weights and with the ring-shaped inner permanent magnet units.
Figure 3C:
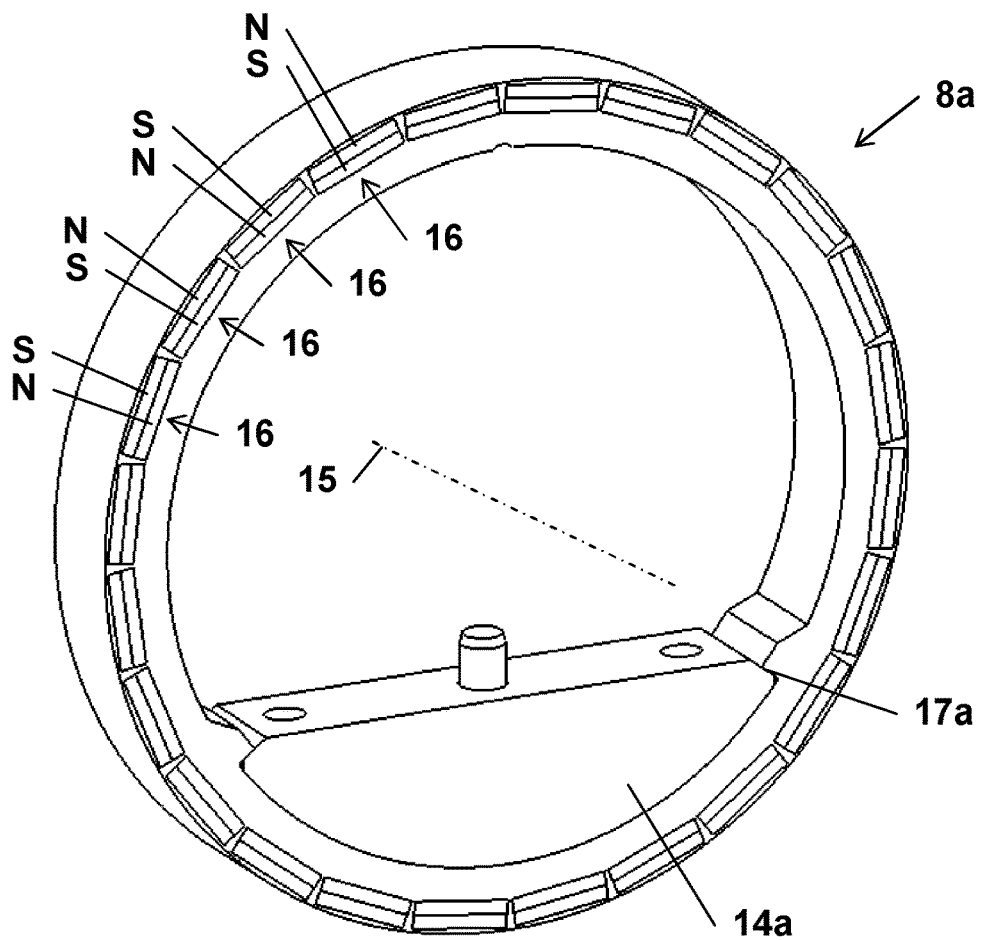
FIG. 3c shows, in an oblique view, the ring-shaped inner permanent magnet unit of the second exemplary embodiment with adjacently arranged first permanent magnets with poles of alternating polarity orientation pointing in a radial direction.

In this exemplary embodiment, too, the inner permanent magnet units 8a, 8b, 8c and 8d have first permanent magnets 16 which are arranged in a line with one another in a circle-circumferential direction in relation to the crankshaft axis 4, in such a way that the magnetic polarity of the first permanent magnets 16 alternates in the circle-circumferential direction, such that a magnetic alternating field is generated during rotation of the crankshaft 3. However, the orientation of the permanent magnets 16 differs in relation to the preceding exemplary embodiments. In this exemplary embodiment, the first permanent magnets 16 are arranged adjacent to one another along the circular inner ring section and have alternating magnetic north poles N and south poles S pointing in a radial direction, as shown in FIG. 3c.

The outer magnetic field units are electromagnetic and are in the form of outer coil units 11a, 11b, 11c and 11d. They have the shape of a circular-arc-shaped outer ring section which surrounds the respective circular path 10a and 10b of the inner permanent magnet units 8a and 8b with a radial spacing and which has a geometric second axis 18 which lies on the crankshaft axis 4, wherein the circular-arc-shaped outer ring section extends with a second center angle β of 180°, as shown in FIG. 3d.

Figure 3D:
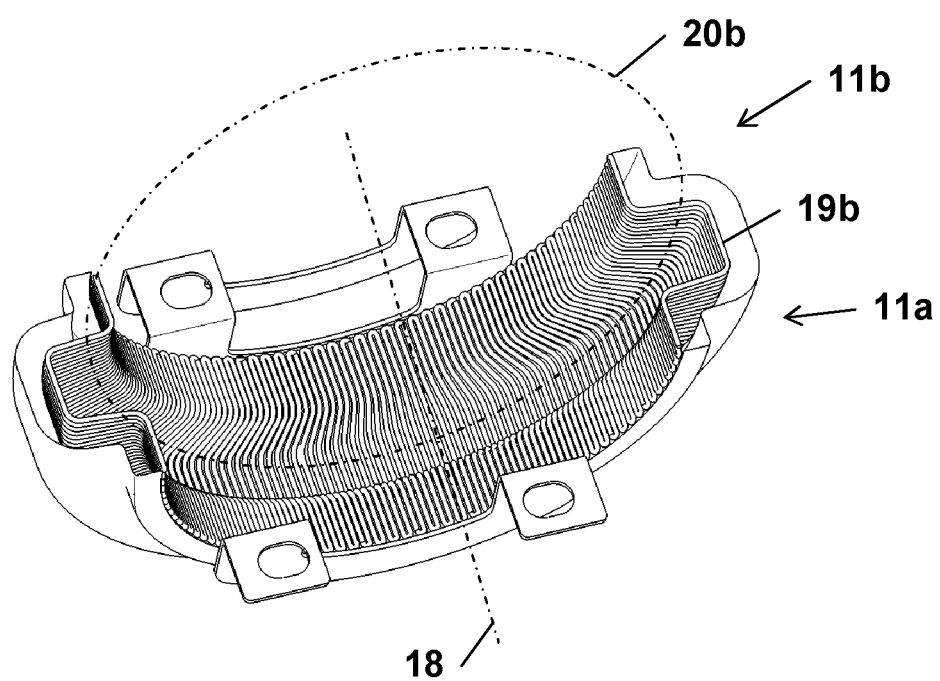
FIG. 3d shows, in an oblique view, the circular-arc-shaped outer coil unit of the second exemplary embodiment, having a second center angle of 180°, with a second coil with a second coil axis running in a circle-circumferential direction.

The outer coil units have a second coil 19b which extends in the circle-circumferential direction and the second ring-shaped coil axis 20b of which runs in the circle-circumferential direction, as shown in FIG. 3d. As is likewise shown in FIG. 3d, in each case two outer coil units 11a and 11b are assembled in one housing, wherein the respective second coils 19b of the two outer coil units 11a and 11b are formed by a common, assembled second coil 19b.

The third exemplary embodiment of the reciprocating-piston engine according to the invention as illustrated in FIGS. 4a to 4d likewise has closed ring-shaped inner permanent magnet units 8a, 8b, 8c and 8d with the geometric first axis 15, but has closed ring-shaped outer coil units 11a, 11b, 11c and 11d.

As in the second exemplary embodiment from FIGS. 3a to 3d, the inner permanent magnet units 8a, 8b, 8c and 8d have first permanent magnets 16 which are arranged in a line with one another in a circle-circumferential direction in relation to the crankshaft axis 4, in such a way that the magnetic polarity of the first permanent magnets 16 alternates in the circle-circumferential direction, such that a magnetic alternating field is generated during rotation of the crankshaft 3.

Figure 4A:
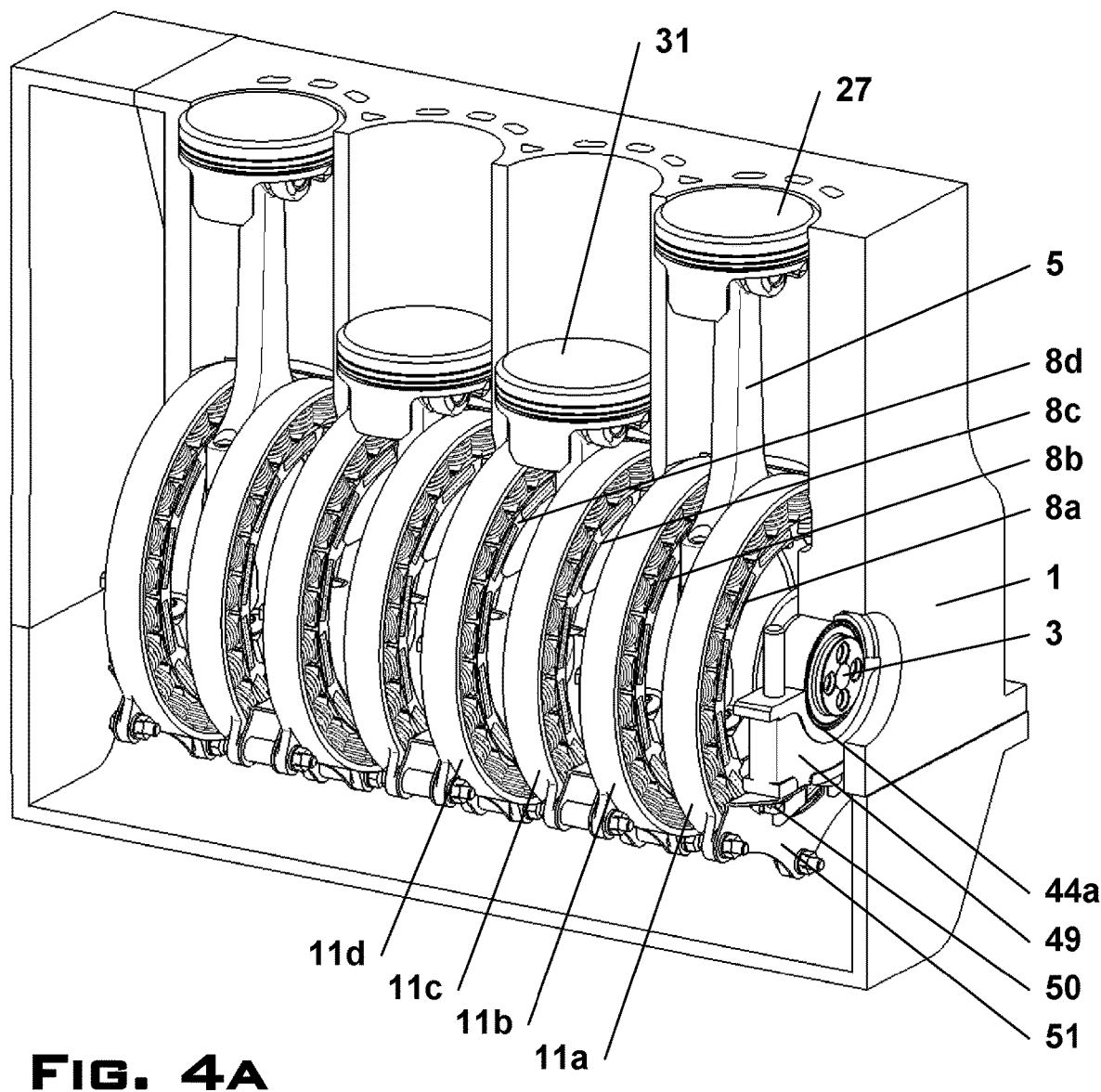
FIG. 4a shows, in an oblique view, a third exemplary embodiment of the reciprocating-piston engine according to the invention with closed ring-shaped inner permanent magnet units and closed ring-shaped outer coil units.
Figure 4B:
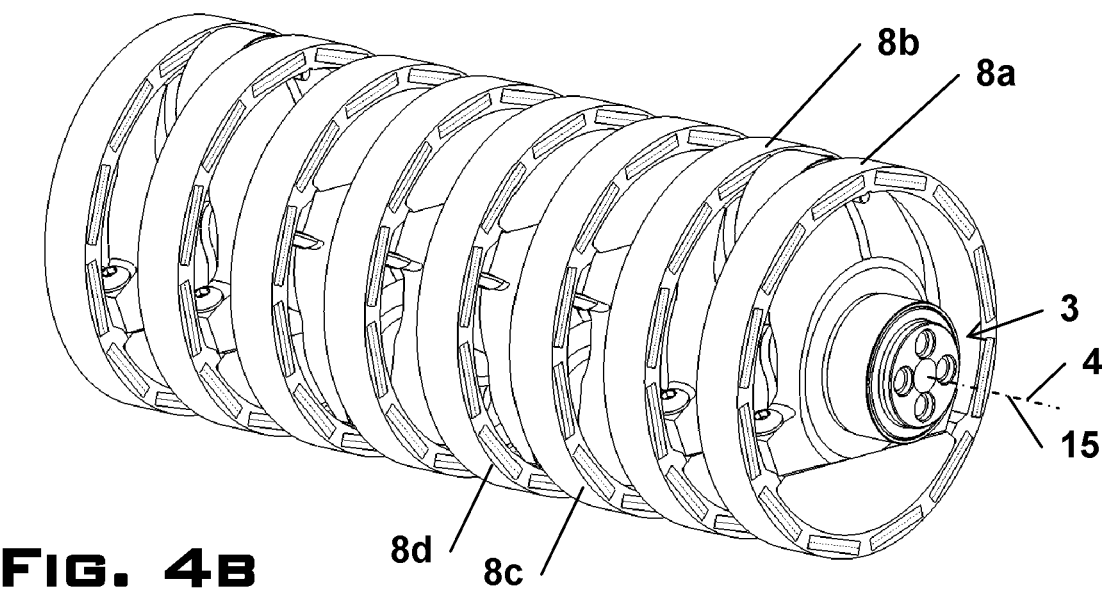
FIG. 4b shows, in an oblique view, the crankshaft of the third exemplary embodiment with balancing weights and with the ring-shaped inner permanent magnet units.
Figure 4C:
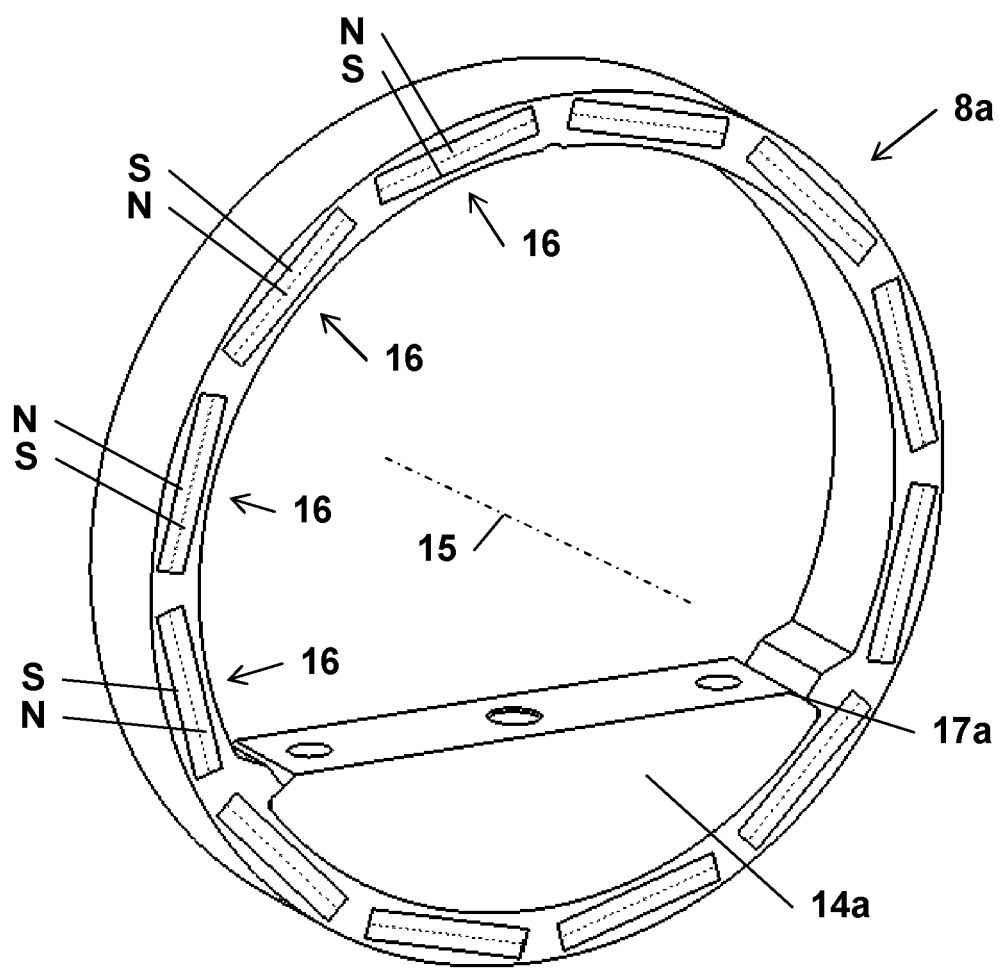
FIG. 4c shows, in an oblique view, the ring-shaped inner permanent magnet unit of the third exemplary embodiment with adjacently arranged first permanent magnets with poles of alternating polarity orientation pointing in a radial direction.

The first permanent magnets 16 are arranged adjacent to one another along the circular inner ring section and have alternating magnetic north poles N and south poles S pointing in a radial direction, as shown in FIG. 4c.

Figure 4D:
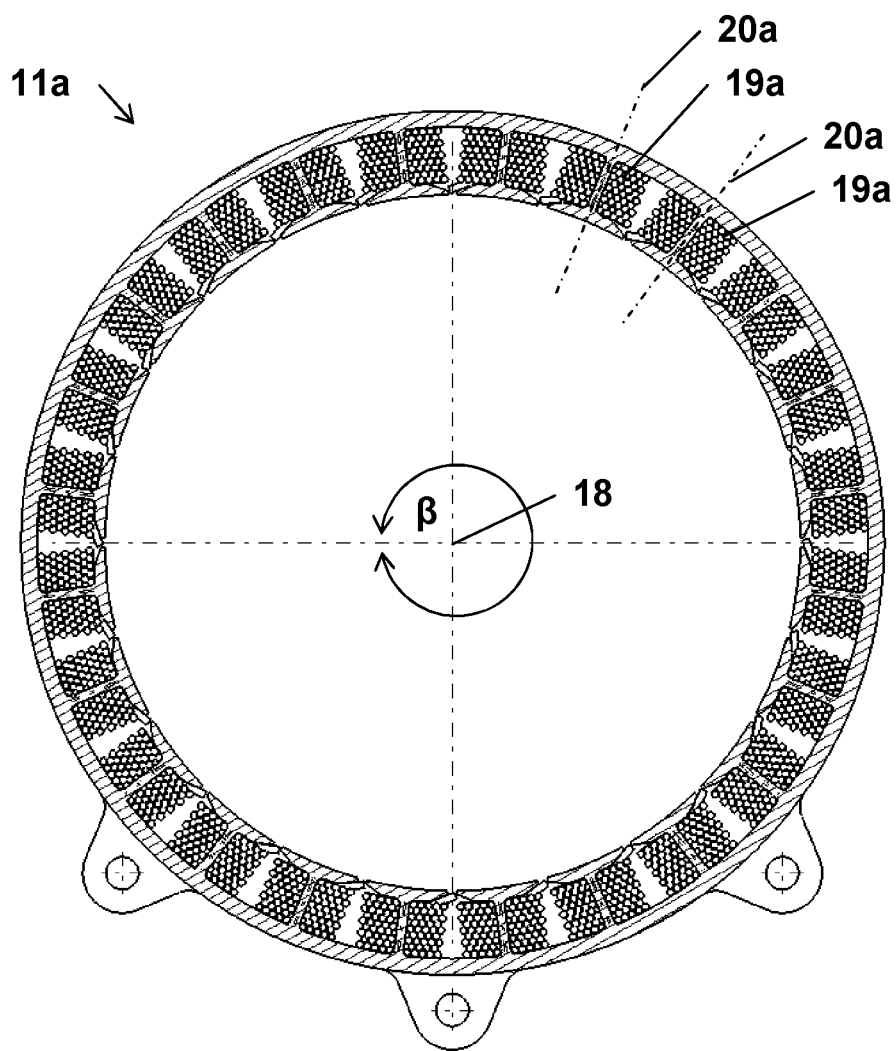
FIG. 4d shows, in a cross-sectional view from a side elevation, the ring-shaped outer coil unit of the third exemplary embodiment, having second coils which are arranged in a line with one another in a circle-circumferential direction and which have second coil axes running radially in relation to the crankshaft axis.

The outer coil units 11a, 11b, 11c and 11d have the shape of a circular-arc-shaped outer ring section which surrounds the respective circular path 10a and 10b of the respective inner permanent magnet unit 8a, 8b, 8c and 8d with a radial spacing and which has a geometric second axis 18 which lies on the crankshaft axis 4, wherein the circular-arc-shaped outer ring section extends with a second center angle β of 360°, such that the outer coil units 11a, 11b, 11c and 11d have the shape of a closed circular outer ring which surrounds the respective circular path 10a and 10b of the respective inner magnetic field unit 8a, 8b, 8c and 8d with a radial spacing, as shown in FIGS. 4a and 4d.

FIG. 4d illustrates the first outer coil units 11a in more detail. It has second coils 19a arranged in a line with one another in a circle-circumferential direction and the second coil axes 20a of which run radially in relation to the crankshaft axis 4, such that said second coil axes intersect at a common point which lies on the second axis 18, which coincides with the crankshaft axis 4.

Figure 5A:
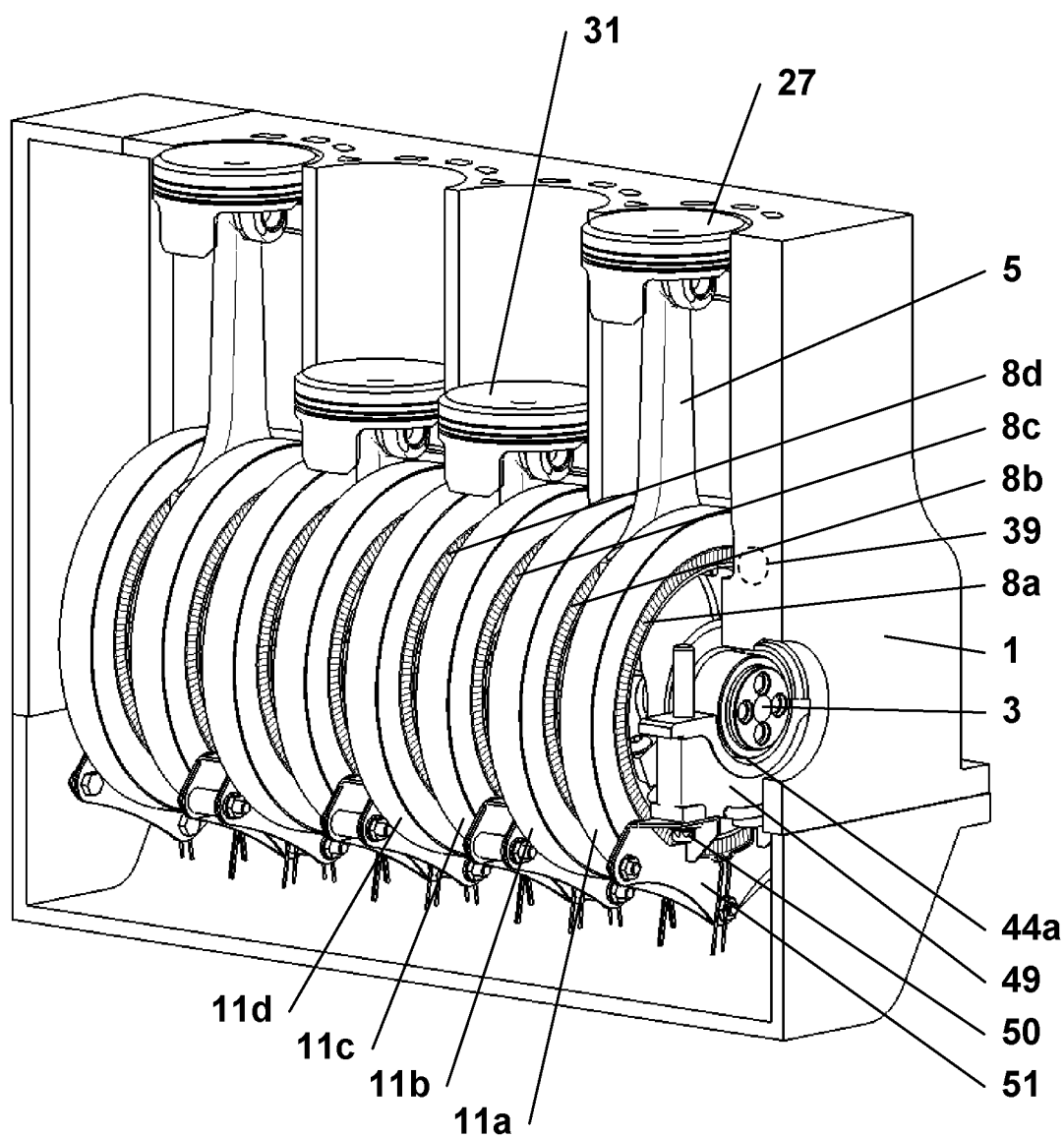
FIG. 5a shows, in an oblique view, a fourth exemplary embodiment of the reciprocating-piston engine according to the invention with closed ring-shaped inner permanent magnet units and closed ring-shaped outer coil units.
Figure 5B:
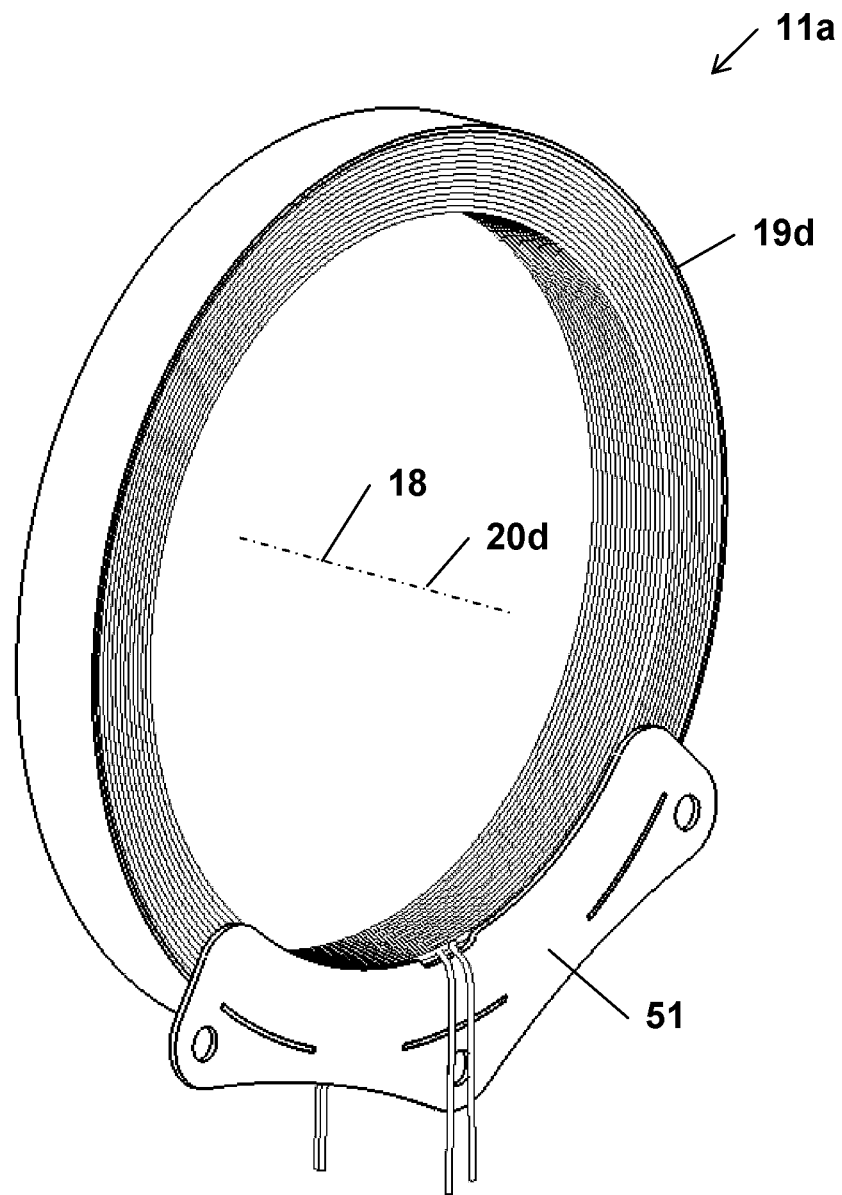
FIG. 5b shows, in an oblique view, the ring-shaped outer coil unit of the fourth exemplary embodiment with a second coil with a second coil axis running parallel to the crankshaft axis.

FIGS. 5a and 5b show a fourth exemplary embodiment of the reciprocating-piston engine according to the invention with closed ring-shaped inner permanent magnet units 8a, 8b, 8c and 8d and with closed ring-shaped outer coil units 11a, 11b, 11c and 11d.

As shown in FIG. 5b, the ring-shaped first outer coil unit 11a of the fourth exemplary embodiment has a second coil 19d with a second coil axis 20d which runs parallel to the crankshaft axis 4 and which lies on the second axis 18. Said second coil 19d fully surrounds the inner permanent magnet unit 8a. The other inner permanent magnet units and outer coil units are constructed in the same way as the first inner permanent magnet unit 8a and the first outer coil unit 11a respectively.

The ring-shaped first outer coil unit 11a with the second coil 19d has a bracket 51 by way of which the first outer coil unit 11a is held directly on the bearing cover 49, which is fixed by way of bearing cover screws 50 to the cylinder block 1, as shown in FIGS. 5a and 5b.

In the exemplary embodiments presented above, the inner magnetic field unit is formed in each case by an inner permanent magnet unit, and the outer magnetic field unit is formed in each case by an outer coil unit. It is however also possible for the inner magnetic field unit to be an inner coil unit and for the outer magnetic field unit to be an outer permanent magnet unit, as illustrated in FIG. 6, or an outer coil unit, corresponding to FIG. 7.

Figure 6:
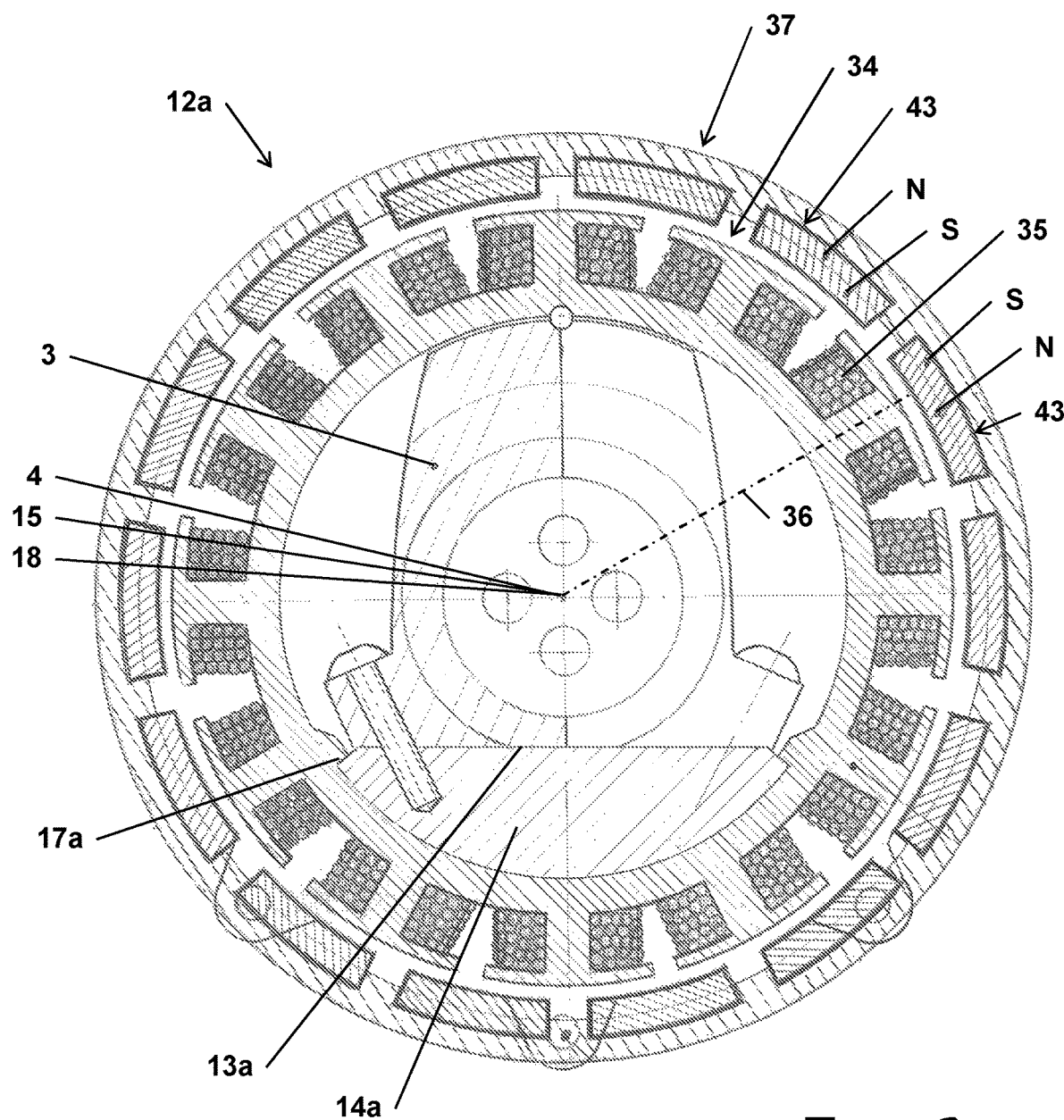
FIG. 6 shows, in a cross-sectional view from a side elevation, a second alternative embodiment having a ring-shaped inner coil unit with first coils which are arranged in a line with one another in a circle-circumferential direction and which have first coil axes running radially in relation to the crankshaft axis, and having a ring-shaped outer permanent magnet unit with adjacently arranged second permanent magnets which have poles of alternating polarity orientation pointing in a radial direction.

FIG. 6 illustrates a second alternative embodiment in which the first inner magnetic field unit, which has the shape of a closed circular inner ring with a first axis 15 which lies on the crankshaft axis 4, is electromagnetic and is in the form of a first inner coil unit 34. The first inner coil unit 34 has first coils 35 which are arranged in a line with one another in a circle-circumferential direction in relation to the crankshaft axis 4 and the first coil axes 36 of which run radially in relation to the crankshaft axis 4.

The first outer magnetic field unit has the shape of a closed circular outer ring with a second axis 18 which lies on the crankshaft axis 4, and said first outer magnetic field unit is permanently magnetic and is in the form of a first outer permanent magnet unit 37. The first outer permanent magnet unit 37 has second permanent magnets 43 which are arranged in a line with one another in a circle-circumferential direction in relation to the crankshaft axis 4, in such a way that the magnetic polarity of the second permanent magnets 43 alternates in the circle-circumferential direction such that a magnetic alternating field is generated during rotation of the crankshaft 3. For this purpose, the second permanent magnets 43 are arranged adjacent to one another along the circular-arc-shaped inner ring section and have north poles N and south poles S of alternating polarity orientation pointing in a radial direction.

Figures 7A, 7B:
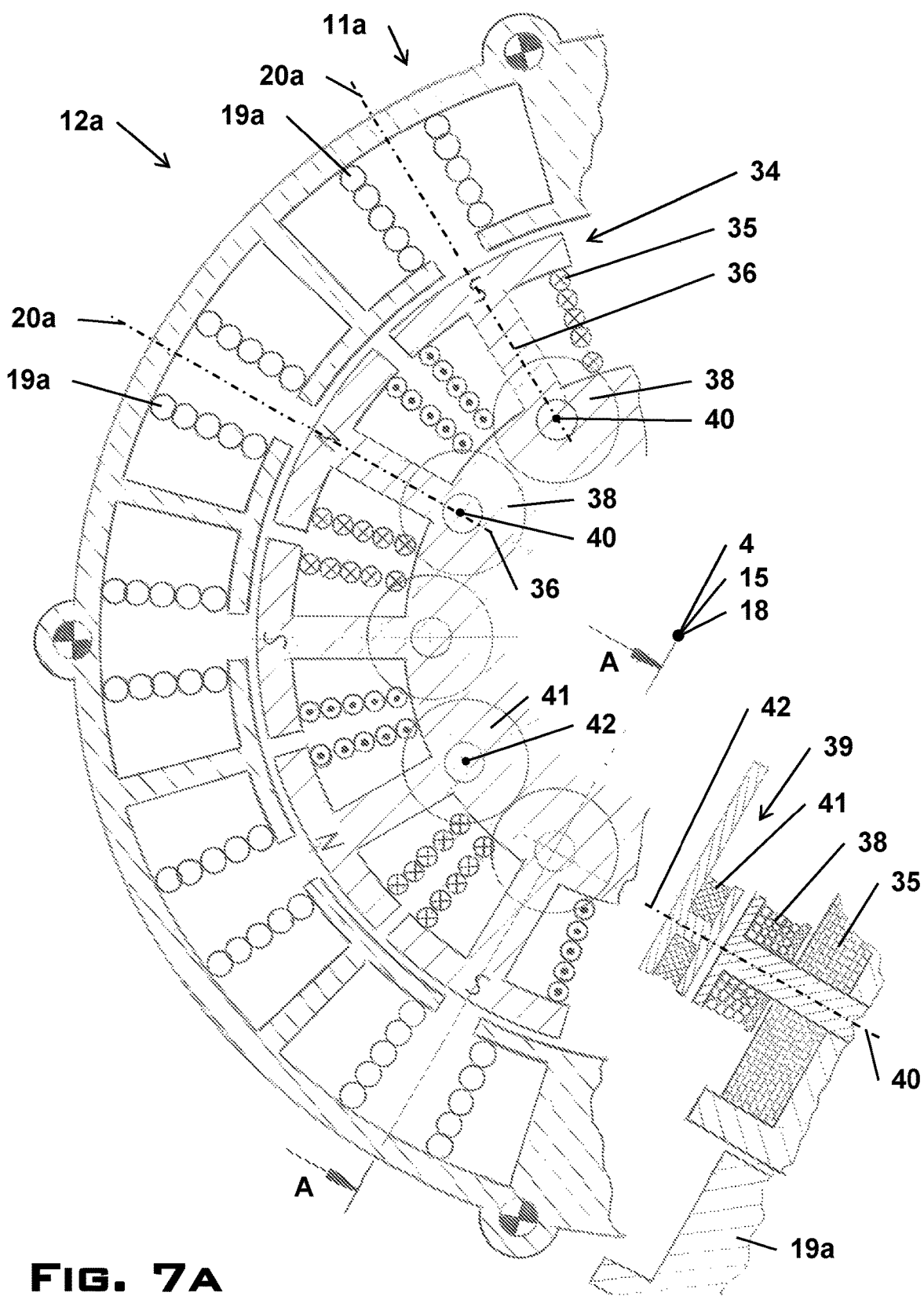
FIG. 7a shows, in a cross-sectional view from a side elevation, a third alternative embodiment having a ring-shaped inner coil unit with first coils which are arranged in a line with one another in a circle-circumferential direction and which have first coil axes running radially in relation to the crankshaft axis, and having a ring-shaped outer coil unit with second coils which are arranged in a line with one another in a circle-circumferential direction and which have second coil axes running radially in relation to the crankshaft axis.
FIG. 7b shows, in a cross-sectional illustration A-A from FIG. 7a, an additional coil, which is connected to a first coil, of the inner coil unit, and a lateral coil.

FIGS. 7a and 7b show a third alternative embodiment of the inner and outer magnetic field units. Whereas it has previously been the case that either the inner or the outer magnetic field unit is formed by a permanent magnet unit, the third alternative embodiment provides that both units are coil units. In this way, the use of permanent magnets can be dispensed with entirely.

As is also the case in the embodiment of FIG. 6, the first inner magnetic field unit has the shape of a closed circular inner ring with a first axis 15 which lies on the crankshaft axis 4. Furthermore, the first inner magnetic field unit is electromagnetic and is in the form of a first inner coil unit 34. The first inner coil unit 34 has first coils 35 which are arranged in a line with one another in a circle-circumferential direction in relation to the crankshaft axis 4 and the first coil axes 36 of which run radially in relation to the crankshaft axis 4 and intersect at the first axis 15.

The first coils 35 are arranged and interconnected such that the magnetic polarity, that is to say the north poles N and south poles S, of the first coils 35 alternates in the circle-circumferential direction, such that a magnetic alternating field is generated during rotation of the crankshaft 3.

The first outer coil unit 11a has the shape of a circular outer ring which surrounds the first inner coil unit 34 with a radial spacing and which has a geometric second axis 18 which lies on the crankshaft axis 4.

The first outer coil unit 11a has second coils 19a which are arranged in a line with one another in a circle-circumferential direction and the second coil axes 20a of which run radially in relation to the crankshaft axis 4, such that said coil axes intersect at a common point which lies on the second axis 18, which coincides with the crankshaft axis 4.

To supply a voltage to the first inner coil unit 34 such that the first coils 35 generate a magnetic alternating field in a circle-circumferential direction during rotation of the crankshaft 3, the first inner coil unit 34 has additional coils 38 which are electrically connected to the first coils 35. Here, each of the first coils 35 is assigned an additional coil 38. The additional coils 38, which are arranged in a line with one another in a circle-circumferential direction, have additional-coil axes which run parallel to the crankshaft axis 4, as shown in FIGS. 7a and 7b.

Electromagnetic lateral magnetic field units 39 are arranged in static fashion in the crank chamber 2 axially adjacent to the first circular path 10a of the first inner coil unit 34, wherein each additional coil 38 is assigned an electromagnetic lateral magnetic field units 39. The arrangement in the crank chamber 2 is indicated schematically in FIG. 5a by way of the reference designation 39. The lateral coils 41, which are arranged in a line with one another in a circle-circumferential direction, have lateral-coil axes 42 which run parallel to the crankshaft axis 4. The additional coils 38 and the lateral magnetic field units 39 are arranged in axially opposed positions with respect to one another in relation to the crankshaft axis 4, and designed, such that, during rotation of the crankshaft 3 about the crankshaft axis 4, said additional coils and lateral magnetic field units together form an electrical generator for the supply of electrical voltage to the first coils 35. Thus, the first inner coil unit 34, when it rotates, forms a magnetic field for generating an induced voltage in the first outer coil unit 11a.

According to the invention, the individual features of the illustrated exemplary embodiments and embodiments may be freely combined.

What is claimed is:

1. A system comprising:
a reciprocating-piston engine, being a 4-stroke engine for driving a vehicle and comprising a crankshaft;
an electrical control unit; and
a crankshaft sensor for detecting a position of the crankshaft,
wherein
the reciprocating-piston engine has an electrically actuatable variable outlet valve drive for at least one first outlet valve which is assigned to a first combustion chamber of a first piston, said electrically actuatable variable outlet valve drive being designed such that the at least one first outlet valve can be opened regardless of the position of the crankshaft, the reciprocating-piston engine has an electrically actuatable variable inlet valve drive for at least one first inlet valve which is assigned to the first combustion chamber, said electrically actuatable variable inlet valve drive being designed such that the at least one first inlet valve can be opened regardless of the position of the crankshaft,
the control unit is designed such that switching between a first operating mode, in which the crankshaft is being driven with combustion engine action, and a second operating mode, in which the crankshaft is being driven without combustion engine action, is performed, wherein the switching is performed in a manner dependent on an electronic accelerator pedal signal and/or in a manner dependent on a crankshaft rotational speed signal or on a time-dependent basis or after a certain number of rotations of the crankshaft, and
the control unit is interconnected with the crankshaft sensor, with the variable inlet valve drive and with the variable outlet valve drive, and designed, such that, in the first operating mode, the inlet valve drive and the outlet valve drive run in 4-stroke operation of the reciprocating-piston engine, and in the second operating mode, the inlet valve drive and the outlet valve drive run in 2-stroke operation of the reciprocating-piston engine, wherein in said 2-stroke operation the at least one first inlet valve is opened in a position range of the crankshaft in which the first piston moves away from the at least one first inlet valve and the at least one first outlet valve is opened in a position range of the crankshaft in which the first piston moves toward the at least one first outlet valve.

2. The system of claim 1, wherein the electrically actuatable variable outlet valve drive is an electromechanical, electromagnetic or pneumatic valve outlet drive.

3. The system of claim 1, wherein the electrically actuatable variable inlet valve drive is an electromechanical, electromagnetic or pneumatic valve inlet drive.

4. The system of claim 1, wherein in said 2-stroke operation the at least one first inlet valve is opened in a range of at least 35%, 50%, 75% or 90% of the position range of the crankshaft in which the first piston moves away from the at least one first inlet valve and the at least one first outlet valve is opened in a range of at least 35%, 50%, 75% or 90% of the position range of the crankshaft in which the first piston moves toward the at least one first outlet valve.

5. The system of claim 1, wherein the crankshaft is mechanically coupled to a electromechanical converter.

6. The system of claim 5, wherein the electromechanical converter is an electric motor or an electrical generator.

7. The system of claim 5, wherein the crankshaft can be driven by the electromechanical converter.

8. The system of claim 2, wherein the crankshaft is mechanically coupled to a electromechanical converter.

9. The system of claim 3, wherein the crankshaft is mechanically coupled to a electromechanical converter.

10. The system of claim 4, wherein the crankshaft is mechanically coupled to a electromechanical converter.

* * * * *